(12) United States Patent
Karumbati et al.

(10) Patent No.: US 11,982,514 B2
(45) Date of Patent: May 14, 2024

(54) INTERCHANGEABLE RIFLE SCOPE DEVICES FOR DISPLAYING VIRTUAL SHOOTING TARGETS THEREON

(71) Applicant: XARPIE LABS LLP, Bengaluru (IN)

(72) Inventors: Sri Karumbati, Bangalore (IN); Matt Rooks, Dublin, OH (US); Anuj Natraj, Bangalore (IN)

(73) Assignee: XARPIE Labs LLP, Bangalore (IN)

( * ) Notice: Subject to any disclaimer, the term of this patent is extended or adjusted under 35 U.S.C. 154(b) by 0 days.

(21) Appl. No.: 17/571,437

(22) Filed: Jan. 7, 2022

(65) Prior Publication Data
US 2022/0214141 A1 Jul. 7, 2022

(30) Foreign Application Priority Data
Jan. 7, 2021 (IN) .............................. 202041043579

(51) Int. Cl.
*F41G 3/26* (2006.01)
(52) U.S. Cl.
CPC ..................................... *F41G 3/26* (2013.01)
(58) Field of Classification Search
CPC ....................................................... F41G 3/26
See application file for complete search history.

(56) References Cited

U.S. PATENT DOCUMENTS 10,510,137 B1 * 12/2019 Kitain .................. F41G 3/2611

* cited by examiner

*Primary Examiner* — Robert P Bullington
(74) *Attorney, Agent, or Firm* — Maier & Maier, PLLC

(57) ABSTRACT

Shooting scopes displaying virtual shooting targets are envisaged. When a virtual shooting target is visualized and shot using the shooting scope attached to a firearm, a pre-programmed computer-based processing element cooperating with the shooting scope determines a theoretical gunshot trajectory based on the position and orientation of the corresponding firearm. The processing element correlates the theoretical gunshot trajectory with the information indicative of the positioning of the virtual shooting target and thereby determines the accuracy with which the virtual gunshot was fired. The processing element also determines the shooter's consistency based on the proximity between the points of impact for a predetermined number of shots fired by the shooter and the center of the virtual shooting target. Basis the shooter's accuracy and consistency, the complexity associated with the virtual shooting targets are varied, and such virtual shooting targets having varying complexities are presented to the shooter for target shooting practice.

12 Claims, 10 Drawing Sheets

| XL DOPE Card | Date | Time | Location | Range Type | Position |
|---|---|---|---|---|---|
| | Sep 1st | 3:00 PM | Lat, Lon | Flat Range | Prone |
| | Rifle/Ammo Type | Target Type | Altitude | Precipitation | Mirage |
| | Bolt-Action | Fixed | 1000m | Drizzle | None |
| Shot | 1 | 2 | 3 | 4 | 5 | 6 | |
| Dist | 100m | 100m | 200m | 200m | 300m | 300m | |
| Wind | Mild | Mild | Mild | Mild | Mild | Mild | |
| Shot | 7 | 8 | 9 | 10 | 11 | 12 | |
| Dist | 400m | 400m | 700m | 700m | | | |
| Wind | Mild | Mild | Mild | Mild | | | |
| Score | Mean | Std | | Score | 60% | |

FIG. 9

INTERCHANGEABLE RIFLE SCOPE DEVICES FOR DISPLAYING VIRTUAL SHOOTING TARGETS THEREON

BACKGROUND

Technical Field

The present disclosure relates to systems and methods that enhance the target shooting skills of individuals. Particularly, the present disclosure also relates to systems and methods that implement a virtual shooting range embodied with virtual targets. More particularly, the present disclosure relates to rifle scopes that display virtual shooting targets thereon.

Description of the Related Art

Shooting from an arms device, for instance, a firearm, is an activity that demands excellent skills, precision, and concentration. Individuals well-versed in handling firearms are typically referred to as sharpshooters. While sharpshooters strive hard to achieve the skills described for efficiently and effectively handling firearms, they must train at regular intervals to sustain and improve their skill sets. Excellency and adeptness in handling firearms, mainly shooting, is achieved with optimum hand-eye coordination, the ability to visualize targets, and the ability to seamlessly align one's body with the vision of the target. And such optimum hand-eye coordination and the ability to seamlessly align the body with the target's vision are attained only through continuous target-shooting practice. Shooters, both experienced and novice, face challenges in accurately shooting at targets exhibiting various dimensions and various stages of mobility.

And to obviate such challenges, shooters, both experienced and novice, visit specialized shooting ranges to access a multitude of firearms, a multitude of shooting targets located in various shooting environments, and indulge in controlled shooting training by firing at pre-positioned targets in a controlled, safer manner. And it is pertinent to note that unless shooters practice target shooting regularly and continually improve upon their hand-eye coordination, their ability to visualize targets and seamlessly align their body with the target's vision and their proficiency in target shooting may diminish over time. However, a novice shooter may find it inconvenient to regularly visit a specialized shooting range because he considers target shooting only a recreational activity and may not pursue it as rigorously as a professional shooter or an experienced shooter.

On the one hand, while a novice shooter may not wish to visit a specialized shooting range regularly, he may still want to use the specialized target practice-related services rendered by such shooting range to the most considerable extent possible, albeit intermittently or infrequently, in comparison to a rate at which professional shooters or expert shooters (marksmen) avail such services. However, given the financials-related complexities associated with establishing and maintaining specialized shooting ranges and given a significant shortage of specialized shooting ranges, it is all the more probable that novice shooters, who pursue shooting only as a hobby and not as a profession or a means of livelihood, may not be enabled to avail specialized target practice-related services as per his convenience and wish. On the other hand, even experienced shooters (or professional shooters or marksmen) are also likely to be plagued by the shortage of specialized shooting ranges, for they may also not be enabled to avail specialized target practice-related services at a frequency of their liking given the significant shortage of specialized shooting ranges. And the lack of specialized shooting ranges and the consequential scarcity of specialized target practice-related services is one of the pressing issues that need a resolution.

Further, specialized shooting ranges, both outdoor and indoor, are designed in line with firearm usage qualifications and for providing specialized training in target shooting. Despite their conformity with the firearm usage qualifications and other norms governing the usage of firearms and the availability of specialized training in target shooting, such specialized shooting ranges are not equipped with the technology necessary to enable shooters to train and practice under a variety of environmental conditions that, in turn, significantly influence the accuracy with which the shooting targets are aimed at and hit. Moreover, in indoor shooting ranges and outdoor shooting ranges, shooters may not be able to configure environmental conditions as per their desire since, as specified above, conventional shooting ranges likely lack the technology necessary to simulate such a variety of environmental conditions.

For instance, in a specialized shooting range, even though shooters could decide on and accordingly alter the distance to a shooting target, elevation and shooting angle corresponding to the shooting target, and zoom corresponding to the shooting target, they (the shooters) may not be enabled to alter, within an indoor shooting range, the parameters such as the temperature, humidity, wind speed, and wind direction. Also, even if an indoor shooting range enables shooters to adjust the indoor temperature and humidity by controlling the functioning of the indoor air conditioning, it may not be equipped with the technology to simulate varying degrees of wind speed and wind direction. And it is a well-established fact that effectively simulating near real-world conditions such as wind speeds, wind directions, and humidity within an indoor shooting range might be a cumbersome and near-impossible task, for as discussed above, indoor shooting ranges may not be equipped with the technology necessary to simulate the aforementioned environmental conditions and to facilitate controlled adjustment of such environmental conditions.

Moreover, even though outdoor shooting ranges, unlike the indoor shooting ranges, enable shooters to adjust the altitude—by providing shooters with access to shooting targets placed at various heights above the ground and multiple orientations—and also allow shooters to practice target shooting under the different wind, temperature, and light conditions, such conditions, in the case of outdoor shooting ranges, are controlled only by nature, and cannot be adjusted or controlled by the shooters as per their target practicing-related requirements. Further, given that they are located in wide-open spaces, outdoor shooting ranges are not likely to possess the technology and equipment necessary for monitoring and actively controlling the aforementioned environmental factors.

In addition, availing of extensive training in target practicing and utilizing the services of specialized shooting ranges continuously is a time-consuming and expensive endeavor. Moreover, even when shooters avail such extensive training and invest heavily in using the services of specialized shooting ranges regularly, the equipment provided to the shooters at the shooting ranges might not satisfy every requirement of individual shooters. For instance, shooters may not feel comfortable using the firearm, ammunition, and attachments available at the shooting ranges. Instead, they may wish to carry their firearms to shooting ranges for target shooting practice. Still, based on their operating policies, the shooting ranges may not allow shooters to carry their firearms and ammunition and instead restrict them to only those firearms and attachments available in the shooting range. Further, certain shooters might not prefer frequently visiting a shooting range and rather wish to practice target shooting at their own pace and convenience. Moreover, most of the shooting ranges function with a one size fits all approach where each shooter visiting the shooting range is handed the same equipment, same ammunition, made to shoot at the same set of targets, and made to follow the same regimen with predictable modifications to the elevation of the shooting targets, shooting angles, zoom, and the like.

And therefore, in view of the drawbacks discussed hitherto, there is a need for a training system that enables shooters, experienced and novice, professional and amateur, to train in target shooting at their convenience and without necessarily visiting a shooting range, outdoor or indoor, regularly. Further, there is also a need for a training system that enables shooters to train with their firearms without having to visit a shooting range necessarily. Further, there was also a need for a training system that allows shooters to control and iteratively adjust various environmental factors that affect the accuracy of target shooting, including elevation, wind speed, wind direction, zoom range, temperature, time of day, the shape of a target, shooting distance, range of motion associated with said target, humidity, and altitude, as per their individual needs and convenience. Further, there is also a need for a training system and method that adapts as per the shooter's performance, and mainly the accuracy exhibited by the shooter in hitting the shooting targets. Further, there is also a need for a training system and method that creates a virtual target shooting environment and enables shooters to train from any location of their convenience, such as home, without visiting a shooting range. Further, there is also a need for a highly interactive training system and method that continually makes shooters aware of their performance statistics and informs them on aspects that need improvisation, all without mandating them to visit a specialized shooting range.

Objects

An object of the present disclosure is to envisage a shooting training system and a method for adaptively training shooters to indulge in target shooting practice in a virtual target shooting environment and without having to visit a shooting range.

Yet another object of the present disclosure is to envisage a plurality of interchangeable scope devices attachable to any firearm and capable of simulating a virtual target shooting environment.

Yet another object of the present disclosure is to envisage a supplementary scope device that simulates a virtual target shooting environment in combination with a plurality of interchangeable scope devices and a plurality of exchangeable scope devices.

Still, a further object of the present disclosure is to envisage a shooting training system and method that simulates shooting ranges with varied configurations and geographies.

One more object of the present disclosure is to envisage shooting scope attachments embodying display units configured to display three-dimensional virtual shooting targets thereon.

Yet another object of the present disclosure is to envisage a shooting training system and method that continuously monitors the shots fired by shooters using the shooting scope attachments and provides the shooters with performance-related insights, including shooting consistency-related insights and shooting accuracy-related insights.

Still, a further object of the present disclosure is to envisage a shooting training system and method that iteratively displays a variety of shooting targets on the display units of the shooting scope attachments, based on the accuracy and the consistency exhibited by the user in hitting the targets.

One more object of the present disclosure is to envisage a shooting training system and method that is mindful of the learning abilities exhibited by the shooters and accordingly depicts the learning abilities of the shooters on corresponding learning paths.

Yet another object of the present disclosure is to iteratively modify the visual content presented as the shooting targets in the virtual shooting ranges, based on individual shooters' preferences and requirements.

Yet another object of the present disclosure is to envisage a virtual shooting training environment that familiarizes shooters with multiple critical aspects of target shooting, including usage and adjustment scope devices, finer scope adjustments for precision aiming and shooting, operating under varied environmental conditions, shooting on various terrains, and coordinating with a spotter.

SUMMARY

The present disclosure envisages a plurality of removably attachable, mutually interchangeable rifle scopes embedded with display units configured to display virtual shooting targets thereon.

The rifle scopes envisaged by the present disclosure can be attached to any firearm irrespective of the make and caliber. The rifle scopes are purpose-made for displaying virtual shooting targets thereon, simulating the functionalities and characteristics of a specialized shooting range, and allowing the users to indulge in controlled target shooting practice. Since the shooting targets are displayed as images on the display units embedded within the rifle scopes, unlike brick-and-mortar shooting ranges where physical objects represent shooting targets, the present disclosure refers to the shooting targets displayed on the display units of the rifle scopes as virtual shooting targets.

When attached to any firearm, the rifle scopes simulate a virtual target-shooting environment and render the firearm usable for virtual shooting training. The rifle scopes, in accordance with the present disclosure, are configured to display thereon a plurality of virtual shooting targets and thereby simulate a virtual target-shooting environment where a user of the firearm (referred to as a 'shooter' for the sake of explanation hereafter) could visualize, aim at, and shoot at a plurality the virtual shooting targets displayed on and viewable through the rifle scopes.

In accordance with the present disclosure, a monocular scope attachment device that can be removably attached to any firearm is disclosed. The monocular device does not embody a display unit. It, therefore, utilizes the display unit of a computer-based device, for example, a user interface of a mobile phone, for displaying the virtual shooting targets, i.e., images of the shooting targets. The monocular scope attachment device does not, by itself, display the virtual shooting targets thereon but utilizes the user interface of the computer-based device for displaying the virtual shooting targets.

The monocular scope attachment device is designed as an attachment to a rifle scope attached to a firearm by default, in the sense that the monocular scope attachment device is configured to be attached to the distal end of the default rifle scope, such that the monocular scope attachment device is always in line with and located in front of the default rifle scope. The monocular scope attachment device is attached to the default rifle scope in such a way that the image of a virtual shooting target displayed on the user interface is projected onto and rendered viewable through the eye-piece of the default rifle scope.

The monocular scope attachment device includes a recess or a slot defined thereon for receiving the computer-based device. The computer-based device, once inserted into the recess defined on the monocular scope attachment device, functions to display the images of virtual shooting targets. A pre-programmed processor embedded within the computer-based device enables the computer-based device to iteratively alter the specifications of the images displayed as virtual shooting targets.

Typically, such specifications-related alterations include altering the type of virtual shooting targets (two-dimensional targets and three-dimensional targets; static shooting targets, horizontally moving shooting targets, and vertically moving shooting targets; shooting targets usable in an indoor shooting environment and shooting targets usable in an outdoor shooting environment; reactive shooting targets and non-reactive shooting targets; explosive shooting targets; interactive shooting targets, non-interactive shooting targets; and shooting targets depicted in various colors), the shooting distance, the elevation of the shooting targets, humidity and temperature of the target-shooting environment, wind speed, wind direction, the range through which the shooting targets can be zoomed-in and zoomed-out, time of day in the target-shooting environment, shape of the shooting target (circular; square, rectangle, cubic, human-shaped, animal-shaped, and bird-shaped), range of motion associated with the shooting target (moving shooting targets, non-moving shooting targets, vertically moving shooting targets, horizontally moving shooting targets, and bouncing shooting targets), altitude of the shooting target (high altitude, low altitude), and response provided by said shooting target on being shot (reactive shooting targets and non-reactive shooting targets). It is pertinent to note that some of the aforementioned specifications (for example, wind speed, wind direction, temperature, humidity) are governed, at least in part, by nature, whereas the remaining specifications, such as the type of shooting targets and the behavior and movements exhibited by the shooting targets can be programmatically controlled and adjusted. However, only for the sake of explanation, the specifications of the images displayed as virtual shooting targets are collectively referred to as environmental conditions-related parameters.

In a preferred embodiment of the present disclosure, to begin with, a virtual shooting target is displayed on the user interface of the computer-based device inserted into the recess formed on the monocular scope attachment device. Following the display of the virtual shooting target on the user interface of the computer-based device, a shooter using the monocular scope attachment device as an attachment to his firearm visualizes the displayed image through the default rifle scope and pulls the trigger embodied on his firearm, thereby shooting at the virtual shooting target displayed on the user interface. As soon as the shooter pulls the trigger, a trigger sensor communicably coupled to the trigger senses a corresponding trigger-pull event and instructs the processor embedded within the computer-based device to calculate a theoretical gunshot trajectory based on the position and orientation of the firearm. Preferably, the position and orientation of the firearm are determined respectively by an accelerometer and a gyroscope embedded within the firearm. Subsequently, the processor correlates the theoretical gunshot trajectory with the information corresponding to the positioning of the virtual shooting target and determines the impact of the shooter's shot on the virtual shooting target, including whether the virtual shooting target was hit or missed; and the location on the virtual shooting target likely to have been impacted by the shot. Preferably, every shooter is allowed twelve shots—often, the number of shots allocated to a shooter is predetermined—at a particular virtual shooting target. After the shooter finishes his quota of the predetermined number of shots, the processor determines the shooting accuracy based on the mutual proximity between a plurality of points of impact created by the predetermined number of shots fired by the shooter. Likewise, for deciding on the consistency of the shots fired by the shooter, the processor determines the points of impact for the predetermined number of shots fired by the shooter. And based on how proximate each of the points of impact is to the center of the displayed virtual shooting target, the processor determines the consistency exhibited by the shooter.

And further, based on the consistency and the accuracy thus determined, the processor embedded within the computer-based device—decides whether to adjust any of the specifications (i.e., the environmental condition-related parameters) that bear a direct impact on the consistency and accuracy with which the shooter hits the displayed virtual targets. As discussed earlier, the parameters under consideration by the processor for an adjustment include elevation of the shooting target, wind speed, wind direction, zoom range, temperature, time of the day, the shape of the shooting target, the type of the shooting target, shooting distance, range of motion associated with the shooting target, humidity, altitude, and the response provided by the shooting target on being shot. Preferably, the parameters mentioned above are iteratively adjusted by the processor based on the consistency and accuracy exhibited by the shooter in hitting the virtual shooting targets.

In accordance with the preferred embodiment of the present disclosure, by adjusting the parameters mentioned above, the processor redefines the images and thus the underlying the virtual shooting targets (displayed on the user interface of the computer-based device inserted into the recess of the monocular scope device). And by introducing controlled adjustments (both user-controlled adjustments and processor-controlled adjustments are envisaged and configured) for the aforementioned parameters, the processor changes how the shooter visualizes the displayed virtual shooting targets and aims and shoots at the virtual shooting targets. Further, some of the parameters mentioned above are iteratively adjusted in real-time, preferably when the shooter visualizes a virtual shooting target displayed on the user interface, based on the accuracy and consistency exhibited by the shooter in hitting the previously displayed virtual shooting targets, such that the complexity in hitting the shooting target (displayed on the user interface, in the case of the monocular scope attachment device) is dynamically altered.

In accordance with the preferred embodiment of the present disclosure, based on the accuracy and consistency exhibited by the shooter in hitting the previously displayed virtual shooting targets, the processor iteratively adjusts any of the aforementioned parameters and continues to track the response provided by the shooter—in terms of shooting accuracy and consistency to such adjustments to the aforementioned parameters. And preferably, if the response exhibited by the shooter, in terms of shooting accuracy and consistency, is on a positive scale, then the processor iteratively adjusts any of the aforementioned parameters such that the complexity in hitting the displayed shooting target is enhanced. On the other hand, if the response exhibited by the shooter, in terms of shooting accuracy and consistency, is on a negative scale, then the processor iteratively adjusts any of the aforementioned parameters such that the complexity in hitting the displayed shooting target is reduced.

The adjustments made to the aforementioned parameters and the accuracy and consistency exhibited by the shooter in hitting the displayed virtual shooting targets embodying the adjusted parameters define the learning path or learning curve corresponding to the shooter. And based on the learning curve corresponding to the shooter, the processor may again alter the specifications of the images underlying the virtual shooting targets displayed on the user interface, preferably until the shooter reaches a predetermined consistency and accuracy-related performance level and also until the shooter completes a predetermined number of target shooting exercises, i.e., hits the predetermined number of virtual shooting targets.

The present disclosure also envisages a monocular scope device that can be removably attached to any firearm to replace the default shooting scope of the firearm. The monocular scope attachment device described above could also be replaced by the monocular scope device since both the monocular scope attachment device and monocular scope device are designed to be interchangeable. The replacement of the monocular scope attachment device with the monocular scope device and vice-versa would have no impact on the functioning of the firearm and the act of the shooter aiming at and hitting the virtual shooting targets, for both the monocular scope attachment device and the monocular scope device are designed to exhibit the same functionalities albeit with different hardware-related configurations.

In the preferred embodiment, the monocular scope device includes an in-built micro-display unit. The monocular scope device differs from the monocular scope attachment device in that the monocular scope device replaces the default scope of the firearm, whereas the monocular scope attachment device is designed as an attachment to the default scope of the firearm; the monocular scope device embodies an in-built micro-display unit, whereas the monocular scope attachment device relies on the user interface of the computer-based device for displaying the virtual shooting targets; the monocular scope device embodies an in-built microcomputer for calculating and correlating the theoretical gunshot trajectory and the position information defining the positional coordinates of the virtual shooting target, whereas the monocular scope attachment device relies on the processor embedded within the computer-based device for such calculations and correlation; the monocular scope device embodies an in-built display unit and microcomputer, whereas in the case of monocular scope attachment device, the user interface (display unit) and the processor are embedded within the computer-based device removably inserted into the recess formed thereon.

In accordance with the preferred embodiment of the present disclosure, the virtual shooting targets are displayed on the micro-display unit of the monocular scope device attached to a fireman. The microcomputer embedded within the monocular scope device is pre-programmed to trigger a display of a multitude of virtual shooting targets on the micro-display unit. And when the shooter pulls the firearm's trigger to hit the virtual shooting target displayed on the micro-display unit, a trigger sensor operatively coupled to the trigger recognizes the corresponding trigger-pull event and instructs the in-built processor to determine the theoretical gunshot trajectory and the positioning of the virtual shooting target. Subsequently, the in-built microcomputer determines the impact of the shooter's shot on the virtual shooting target, including whether the virtual shooting target was hit or missed; and the location on the virtual shooting target likely to have been impacted by the shot.

As discussed previously, every shooter is allowed twelve shots at a particular virtual shooting target. After the shooter finishes his quota of the predetermined number of shots, the microcomputer determines the accuracy based on the mutual proximity between a plurality of points of impact created by the predetermined number of shots fired by the shooter. Likewise, for deciding on the consistency of the shots fired by the shooter, the microcomputer determines the points of impact for the predetermined number of shots fired by the shooter. And based on how proximate each of the points of impact is to the center of the displayed virtual shooting target, the microcomputer determines the consistency exhibited by the shooter.

And, based on the consistency and the accuracy thus determined, the microcomputer decides whether to adjust any of the aforementioned parameters that affect the consistency and accuracy with which the shooter hits the displayed virtual targets. The parameters under consideration in the case of the monocular scope device are the same as those under consideration for the monocular scope attachment device. As was the case with the monocular scope attachment device, the parameters are iteratively adjusted by the microcontroller embedded within the monocular scope device based on the consistency and accuracy exhibited by the shooter in hitting the virtual shooting targets. In line with the functioning of the processor of the computer-based device inserted into the recess of the monocular scope attachment device, the microcomputer embedded within the monocular scope device also adjusts the parameters mentioned above and redefines the images underlying the virtual shooting targets displayed on the micro-display unit of the monocular scope device.

In accordance with the preferred embodiment of the present disclosure, based on the accuracy and consistency exhibited by the shooter in hitting the previously displayed virtual shooting targets, the microcomputer (embedded within the monocular scope device) iteratively adjusts any of the aforementioned parameters and continues to track the response provided by the shooter—in terms of shooting accuracy and consistency—to such adjustments to the aforementioned parameters. And preferably, if the response exhibited by the shooter, in terms of shooting accuracy and consistency, is on a positive scale, then the microcomputer iteratively adjusts any of the aforementioned parameters such that the complexity in hitting the displayed shooting target is enhanced. On the other hand, if the response exhibited by the shooter, in terms of shooting accuracy and consistency, is on a negative scale, then the microcomputer iteratively adjusts any of the aforementioned parameters such that the complexity in hitting the displayed shooting target is reduced.

Further, in line with the functioning of the processor embedded within the computer-based device inserted into the recess of the monocular scope attachment device, the microcomputer embedded within the monocular scope device also changes, by way of adjusting the aforementioned parameters, how the shooter visualizes the displayed virtual shooting targets and aims and shoots at the displayed virtual shooting targets. Further, as was the case with the monocular scope attachment device, some of the parameters mentioned above are iteratively adjusted in real-time, preferably when the shooter visualizes a virtual shooting target displayed on the micro-display unit embedded within the monocular scope device, based on the accuracy and consistency exhibited by the shooter in hitting the previously displayed virtual shooting targets, such that the complexity in hitting the shooting target (displayed on the micro-display unit, in the case of the monocular scope device) is dynamically altered.

In accordance with the preferred embodiment of the present disclosure, based on the accuracy and consistency exhibited by the shooter in hitting the previously displayed virtual shooting targets, the microcomputer also iteratively adjusts any of the aforementioned parameters and continues to track the response provided by the shooter—in terms of shooting accuracy and consistency—to such adjustments to the aforementioned parameters. The adjustments made to the aforementioned parameters and the accuracy and consistency exhibited by the shooter in hitting the shooting targets embodying the adjusted parameters define the learning path or learning curve corresponding to the shooter, as was the case with the monocular scope attachment device. And based on the learning curve corresponding to the shooter, the microcomputer may iteratively alter the characteristics and the complexity of the virtual shooting targets displayed on the micro-display unit, preferably until the shooter reaches a predetermined consistency and accuracy-related performance level and also until the shooter completes a predetermined number of target shooting exercises, i.e., hits the predetermined number of virtual shooting targets.

The present disclosure also envisages a binocular scope device that can be removably attached to any firearm as a replacement to the default shooting scope of the firearm. Further, both the monocular scope attachment device and monocular scope device could be replaced by the binocular scope device since the monocular scope attachment device, the monocular scope device, and the binocular scope device are designed to be interchangeable. The interchangeability of the monocular scope attachment device, monocular scope device, and the binocular scope device would have no negative impact on the functioning of the firearm, and the act of the shooter aiming at and hitting the virtual shooting targets, for all three scope devices are designed to exhibit the same functionalities albeit with different hardware-related configurations.

In the preferred embodiment, the binocular scope device includes two in-built micro-display units, one for each eye of the shooter. The binocular scope device differs from the monocular scope attachment device and the monocular scope device in that it includes two micro-display units that independently and simultaneously display the same virtual shooting target (i.e., the image of the virtual shooting target) to both the eyes of the shooter, i.e., the dominant eye as well as the non-dominant eye. In line with the construction of the monocular scope device, the binocular scope device also acts as a replacement for the default rifle scope of the firearm used by the shooter. In line with the construction of the monocular scope device, the binocular scope device also includes an in-built microcomputer that embodies functional capabilities substantially similar to that of the microcomputer embedded within the monocular scope device. Further, the binocular scope device differs from the monocular scope attachment device for the same reasons the monocular scope device differs from the monocular scope attachment device.

In accordance with the preferred embodiment of the present disclosure, the virtual shooting targets are displayed individually and simultaneously on the two micro-display units of the binocular scope device attached to the firearm. The microcomputer embedded within the binocular scope device is pre-programmed to trigger a display of a multitude of virtual shooting targets, simultaneously and individually, on the two micro-display units. And when the shooter pulls the firearm's trigger to hit the virtual shooting target, a trigger sensor operatively coupled to the trigger recognizes the corresponding trigger-pull event and instructs the in-built microcomputer (of the binocular scope device) to determine the theoretical gunshot trajectory and the positioning of the virtual shooting target. Subsequently, the in-built microcomputer determines the impact of the shooter's shot on the virtual shooting target, including whether the virtual shooting target was hit or missed; and the location on the virtual shooting target likely to have been impacted by the shot.

Based on the theoretical gunshot trajectory and the position information defining the positional coordinates of the virtual shooting target, the microcomputer embedded within the binocular scope device determines the accuracy associated with the shot fired by the shooter.

For instance, every shooter is allowed twelve shots at a particular virtual shooting target. After the shooter finishes his quota of the predetermined number of shots, the accuracy is determined, by the microcomputer (embedded within the binocular scope device), based on the mutual proximity between a plurality of points of impact created by the predetermined number of shots fired by the shooter. Likewise, for deciding on the consistency of the shots fired by the shooter, the microcomputer determines the points of impact for the predetermined number of shots fired by the shooter. And based on how proximate each of the points of impact is to the center of the displayed virtual shooting target, the microcomputer determines the consistency exhibited by the shooter.

And, based on the consistency and the accuracy thus determined, the microcomputer (embedded within the binocular scope device) decides whether to adjust any of the aforementioned parameters that affect the consistency and accuracy with which the shooter hits the displayed virtual shooting targets. The parameters under consideration in the case of the binocular scope device are the same as those under consideration for the monocular scope attachment device and monocular scope device. As was the case with the monocular scope attachment device and the monocular scope device, the parameters are iteratively adjusted by the microcomputer embedded within the binocular scope device based on the consistency and accuracy exhibited by the shooter in hitting the virtual shooting targets. In line with the functioning of the processor embedded within the computer-based device inserted into the recess of the monocular scope attachment device, the microcomputer embedded within the binocular scope device also adjusts the parameters mentioned above, thus redefining the images of the virtual shooting targets displayed on the two micro-display units of the binocular scope device.

The difference between the monocular scope attachment device, on the one hand, and the monocular scope device and binocular scope device, on the other hand, is that the monocular scope attachment device derives its processing capabilities from a pre-programmed processor embedded within the computer-based device inserted into the recess thereof, whereas, both the monocular scope device and binocular scope device derive their processing capabilities from respective in-built microcomputers. Yet another difference between the monocular scope attachment device, on the one hand, and the monocular scope device and binocular scope device, on the other hand, is that the monocular scope attachment device does not possess a display unit of its own and instead uses the user interface of the computer-based device inserted into the recess thereof as a display unit, whereas, both the monocular scope device and binocular scope device include in-built micro-display units; one in the case of the monocular scope device and two in the case of the binocular scope device.

The differences mentioned above notwithstanding, the binocular scope device exhibits similarities to the monocular scope device and the monocular scope attachment device as far as the manner of processing and iterative adjustment of the parameters that affect the consistency and accuracy with which the shooter hits the displayed virtual shooting targets is concerned. The parameters considered in the case of the binocular scope device are the same as the parameters considered for the monocular scope device and monocular scope attachment device.

Further, in line with the functioning of the processor embedded within the computer-based device inserted into the recess of the monocular scope attachment device and the microcomputer embedded within the monocular scope device, the microcomputer embedded within the binocular scope device also changes, by way of adjusting the aforementioned parameters, how the shooter visualizes the virtual shooting targets displayed, simultaneously and individually, on the two micro-display units, and aims and shoots at the displayed virtual shooting targets.

Further, as was the case with the monocular scope attachment device and the monocular scope device, some of the parameters mentioned above are iteratively adjusted in real-time by the microcomputer embedded within the binocular scope device, preferably when the shooter visualizes a virtual shooting target displayed simultaneously and independently on both the micro-display units, based on the accuracy and consistency exhibited by the shooter in hitting the previously displayed virtual shooting targets.

In accordance with the preferred embodiment of the present disclosure, based on the accuracy and consistency exhibited by the shooter in hitting the previously displayed virtual shooting targets, the microcomputer (embedded within the binocular scope device) iteratively adjusts any of the aforementioned parameters and continues to track the response provided by the shooter—in terms of shooting accuracy and consistency—to such adjustments to the aforementioned parameters. And preferably, if the response exhibited by the shooter, in terms of shooting accuracy and consistency, is on a positive scale, then the microcomputer iteratively adjusts any of the aforementioned parameters such that the complexity in hitting the displayed shooting target is enhanced. On the other hand, if the response exhibited by the shooter, in terms of shooting accuracy and consistency, is on a negative scale, then the microcomputer iteratively adjusts any of the aforementioned parameters such that the complexity in hitting the displayed shooting target is reduced.

The adjustments made to the aforementioned parameters and the accuracy and consistency exhibited by the shooter in hitting the shooting targets embodying the adjusted parameters define the learning path or learning curve corresponding to the shooter, as was the case with the monocular scope attachment device and the monocular scope device. And based on the learning curve corresponding to the shooter, the microcomputer embedded within the binocular scope device may also change the virtual shooting targets displayed simultaneously and independently on both the micro-display units, iteratively perform comparatively finer adjustments on any of the aforementioned parameters as far as the displayed virtual shooting targets are concerned, and continue to make such iterative adjustments to at least some of the aforementioned parameters, preferably until the shooter reaches a predetermined consistency and accuracy-related performance level and also until the shooter completes a predetermined number of target shooting exercises, i.e., hits the predetermined number of virtual shooting targets.

BRIEF DESCRIPTION OF THE ACCOMPANYING DRAWINGS

FIG. 1 illustrates a shooting scope device attached to a firearm fitted with a default rifle scope, in accordance with the present disclosure;

FIGS. 2A-2B, in combination, illustrate a perspective view and a side elevation view of a monocular scope attachment device attachable to a firearm, in accordance with the present disclosure;

FIG. 3 illustrates a monocular scope device attached to a firearm as a replacement to the default rifle scope thereof, in accordance with the present disclosure;

FIGS. 4A-4B, in combination, illustrate a partial, cut-away perspective view and a side elevation view of a monocular scope device, attachable to a firearm, in accordance with the present disclosure;

FIG. 9 illustrates an exemplary performance report comprising performance metrics generated by the intelligent virtual training system, according to an embodiment of the present invention.

DETAILED DESCRIPTION

Figure 1:
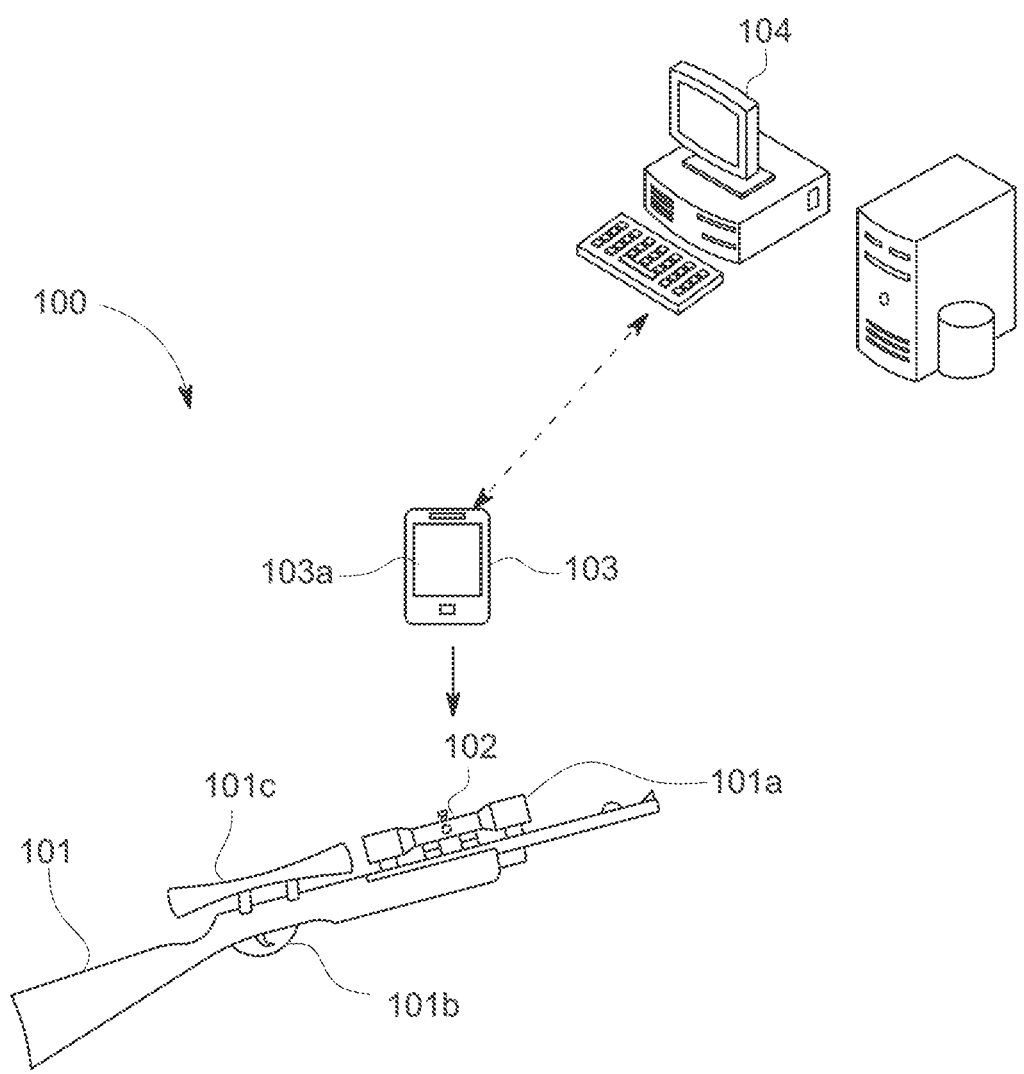

In accordance to obviate the drawbacks discussed hitherto and in order to enable shooters to practice target shooting without having to visit a shooting range essentially, the present disclosure envisages a training system and method that can be virtually implemented on purpose-made, mutually interchangeable scope devices configured to display three-dimensional images of shooting targets, on being attached to a firearm. In accordance with the present disclosure, the interchangeable scope devices, when attached to a firearm, simulate a virtual target-shooting environment incorporating a plurality of virtual shooting targets. Unlike brick and motor shooting ranges that represents shooting targets in the form of physical and tangible objects, the interchangeable scope devices envisaged by the present disclosure display three-dimensional images of a variety of shooting targets, for example, static shooting targets, circular shooting targets, cubic-shaped shooting targets, animal-shaped shooting targets, bird-shaped shooting targets, and the like, on display units incorporated therein. And therefore, the shooting targets displayed on the interchangeable scope devices are termed virtual shooting targets. A shooting environment that enables the display and utilization of such virtual shooting targets for target shooting or target practicing is also termed a virtual target-shooting environment.

The training system and method envisaged by the present disclosure enable shooters to shoot at a plurality of virtual shooting targets displayed in the form of three-dimensional images on the display units incorporated within the scope devices. In this document, the terms 'user' and 'shooter' are used interchangeably. But both the terms are meant to refer to a person who necessitates shooting training, target practicing, is not keen on regularly visiting a shooting range but is willing to use the scope devices envisaged by the present disclosure in combination with his firearm and shoot virtual shooting targets displayed on the scope devices. The training system envisaged by the present disclosure is also utilized for training shooters in target practicing or target shooting by engaging them with a plurality of virtual shooting targets characterized by a plurality of varying environmental conditions that are likely to affect the manner in which the shooter visualizes and shoots at the virtual shooting targets.

The present disclosure envisages three different yet interchangeable scope devices attachable to a firearm. In accordance with the present disclosure, the interchangeable scope devices include a monocular scope attachment device, a monocular scope device, and a binocular scope device. In accordance with the present disclosure, a shooter, at any given point in time, is provided with an opportunity to select only one of the three interchangeable scope devices for target shooting. Each of the three scope devices is configured to be operatively coupled to a rail of a firearm accessible to the shooter.

Each of the three interchangeable scope devices allows shooters to train in a virtual target-shooting environment embodying a plurality of virtual shooting targets. Each of the three interchangeable scope devices allows shooters to train under various virtual environmental conditions that can be iteratively tweaked either based on the preferences of the shooter or by a pre-programmed microcontroller or a processor, based on the accuracy and consistency exhibited by shooters while training under such varying virtual environmental conditions. Each of the three interchangeable scope devices also enables shooters to receive reasonable exposure, albeit virtually, to various environmental conditions and terrains but without visiting either an indoor shooting range or an outdoor shooting range.

In accordance with the present disclosure, FIG. 1 illustrates the construction of a monocular scope attachment device 102 attached to a firearm 101 embodying a default rifle scope 101c. The firearm 101, as illustrated in FIG. 1, comprises a rail 101a and a trigger 101b. The rail 101a of the firearm 101 is a standard chassis rail. The trigger 101b is a firing mechanism of the firearm 101. A trigger sensor 120 is operably coupled to the trigger 101b of the firearm 101. The trigger sensor 120 is configured to detect a pull event of trigger 101b.

In accordance with the present disclosure, the monocular scope attachment device 102 is removably attached to firearm 101. The monocular scope attachment device 102 is attached to the rail 101a of the firearm 101 and in line with the default rifle scope 101c. In accordance with the present disclosure, the monocular scope attachment device 102 is mounted inline and in front of the default rifle scope 101c pre-attached to the firearm 101. The monocular scope attachment device 102 is configured to fit on the rail 101a of the firearm 101 as an attachment to the default rifle scope 101c.

The monocular scope attachment device 102, when mounted onto the firearm 101, enables a shooter to visualize and shoot at a plurality of virtual shooting targets, with the virtual shooting targets rendered viewable through the default rifle scope 101c, but from a computer-based device inserted into a recess 109 formed on the monocular scope attachment device 102, and in proximity to the distal end of the rifle scope 101c. Preferably, the monocular scope attachment device 102 comprises a recess 109 illustrated in FIGS. 2A-2B, for removably receiving a computer-based device 103, for example, a mobile phone or a smart phone.

In accordance with the present disclosure, the computer-based device 103 is configured to display images representative of a plurality of virtual shooting targets when removably inserted into the recess 109 formed on the monocular scope attachment device 102. In accordance with the present disclosure, the computer-based device 103, removably inserted into the recess 19 formed on the monocular scope attachment device 102, includes a processor (not shown in figures) and a user interface 103a. Preferably, the user interface 103a is embodied in a display unit integral to the computer-based device 103. The processor, in accordance with the present disclosure, is configured to trigger the display of a plurality of images representative of virtual shooting targets on the user interface 103a.

In accordance with the present disclosure, the processor is configured to render multiple options to a shooter for the selection and configuration of virtual shooting targets. The shooter may select and switch between images of various virtual shooting targets using the predetermined options rendered viewable by the said processor on the user interface 103a.

In accordance with the present disclosure, the processor embedded within the computer-based device 103—removably inserted into the recess 109 formed on the monocular scope device 102—is configured to generate at least one image of a virtual shooting target based on selection criteria defined by the shooter. Preferably, the selection criteria specified by the shooter includes a selection of at least a type of virtual shooting target (two-dimensional shooting targets and three-dimensional targets; static shooting targets, horizontally moving shooting targets, and vertically moving shooting targets; shooting targets usable in an indoor shooting environment and shooting targets usable in an outdoor shooting environment; reactive shooting targets and non-reactive shooting targets; explosive shooting targets; interactive shooting targets, non-interactive shooting targets; and shooting targets depicted in various colors).

Further, the selection criteria specified by the shooter includes a selection of the shooting distance, the elevation corresponding to the shooting targets, humidity and temperature of the target-shooting environment, wind speed, wind direction, the range through which the virtual shooting targets can be zoomed-in and zoomed-out, time of day in the target-shooting environment, the shape of the virtual shooting target (circular; square, rectangle, cubic, human-shaped, animal-shaped, and bird-shaped), the range of motion associated with the virtual shooting target (moving shooting targets, non-moving shooting targets, vertically moving shooting targets, horizontally moving shooting targets, and bouncing shooting targets), altitude of the virtual shooting target (high altitude, low altitude), and the response provided by said virtual shooting target on being shot (reactive shooting targets and non-reactive shooting targets).

It is pertinent to note that some of the aforementioned specifications (for example, wind speed, wind direction, temperature, humidity) are governed, at least in part, by nature, whereas the remaining specifications such as the type of shooting targets, the behavior exhibited by the virtual shooting targets on being shot, and the movements exhibited by the shooting targets can be programmatically controlled and adjusted based on the functionalities embedded into the processor embedded within the computer-based device 103 removably inserted into the recess 109 of the monocular scope attachment device 102. In accordance with the present disclosure, the parameters specified as a part of the selection criteria made available to the shooter are termed as parameters that characterize every image displayed as a virtual shooting target.

It is pertinent to note that some of the aforementioned parameters, in the real world, are governed at least in part by nature (for example, wind speed, wind direction, temperature, humidity), whereas the remaining parameters, such as the type of shooting targets, the behavior exhibited by the virtual shooting targets on being shot, and the movements exhibited by the shooting targets can be programmatically controlled and adjusted based on the functionalities embedded into the processor embedded within the computer-based device 103 removably inserted into the recess 109 of the monocular scope attachment device 102. But in the case of the present disclosure, each of the parameters is virtually adjustable such that any adjustments made virtually to any of the parameters impact the display of the virtual shooting target. And therefore, only for the sake of explanation, the parameters defining or characterizing the images displayed as virtual shooting targets are collectively referred to as virtual adjustable parameters. Throughout the specification document, the terms 'virtual adjustable parameters,' 'characterizing parameters,' and 'parameters' are used interchangeably. But all the terms are intended to refer to the same set of parameters that define or characterize the images of the virtual shooting targets.

Figure 2A:
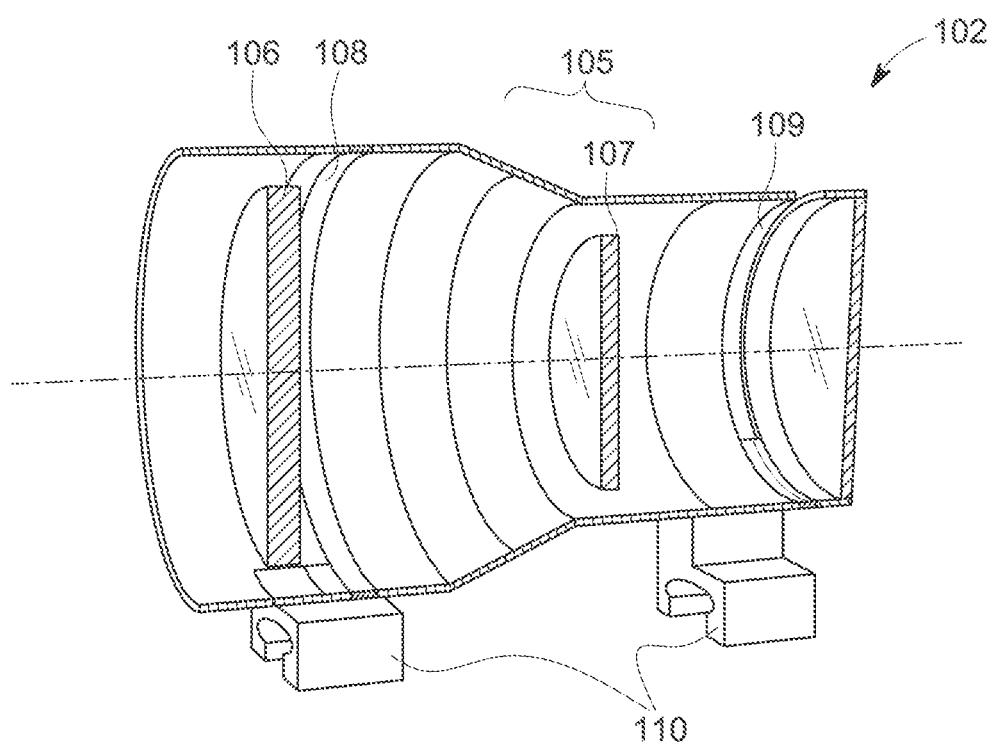
Figure 2B:
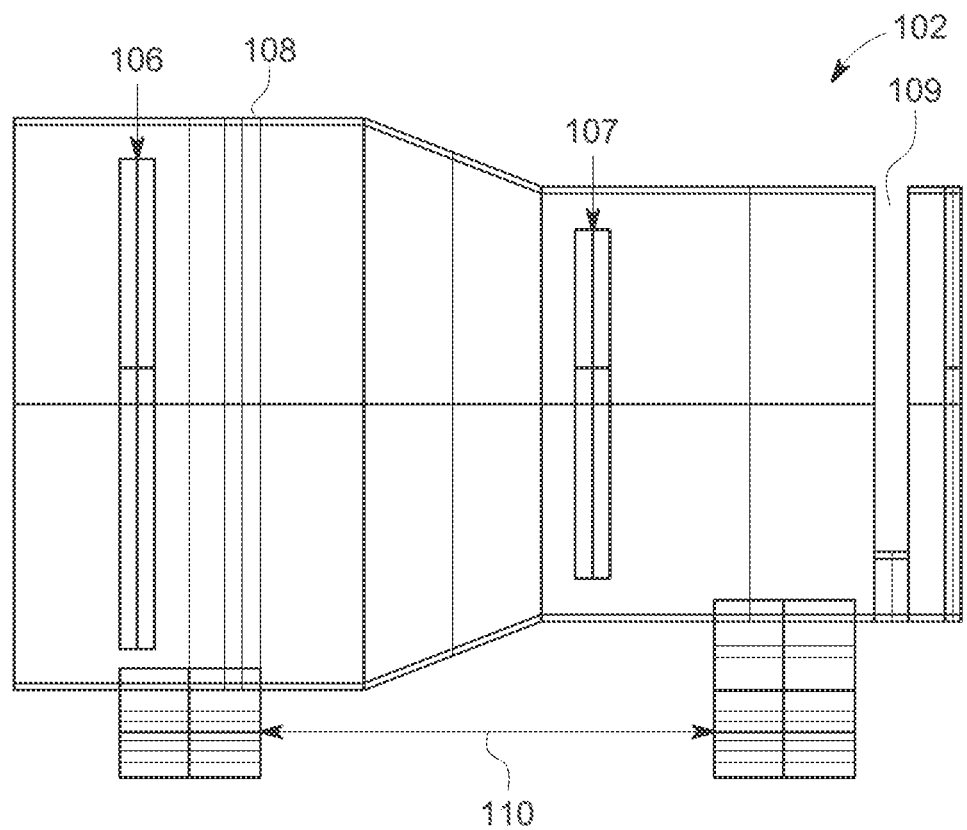

In accordance with the present disclosure, the monocular scope attachment device 102 is communicably coupled to a plurality of control elements, for example, a zoom device 108 illustrated in FIGS. 2A-2B, and the position sensors 119. In accordance with the present disclosure, the position sensors 119, including a gyroscope sensor and an accelerometer, are built into the computer-based device 103. The position sensors 119 generate positional data describing at least the position and orientation of the firearm 101.

The images of virtual shooting targets displayed on the user interface 103a of the computer-based device 103 are three-dimensional (3D) images. It is possible that more than one image of a virtual shooting target is displayed on the user interface 103a, and the display of more than one image of a virtual shooting target may constitute a display of a virtual shooting range. The images displayed on the user interface 103a, in addition to illustrating the corresponding virtual shooting targets, also illustrate the landscape surrounding the virtual shooting targets, daylight conditions, and the like. The processor configures the virtual shooting targets, for example, as a full-fledged 3D digital model. The positional data received from the gyroscope and accelerometer determines the view rendered to the shooter through the combination of the user interface 103a and the default rifle scope 101c.

The 3D digital model of the virtual shooting targets comprises animations, for example, moving targets, daylight conditions, night vision, landscape, and the like. In accordance with the present disclosure, the processor is configured to generate real-time animations of the virtual shooting targets, with the animations embodies into the virtual shooting targets being influenced by a plurality of virtual adjustable factors, including elevation associated with the virtual shooting targets, wind speed, wind direction, zoom range, temperature, time of day, the shape of the virtual shooting targets, the type of the virtual shooting targets, shooting distance, range of motion associated with the virtual shooting targets, humidity, altitude, and the response provided by the virtual shooting target on being shot.

As discussed earlier, each of the aforementioned virtual adjustable factors is configured by the shooter through the computer-based device 103. Alternatively, the processor embedded within the computer-based device 103 sets each of the parameters to corresponding default values before presenting a first virtual shooting target to the shooter; and the processor embedded within the computer-based device 103 may iteratively adjust each of the virtual adjustable parameters between every shot taken by the shooter. Further, while displaying a plurality of shooting targets to the shooter, on the user interface 103a, the processor 103 may adjust each of the virtual adjustable parameters corresponding to the virtual shooting targets such that the shooting targets differ from one another in terms of characterization.

In accordance with the present disclosure, the positioning of the computer-based device 103 within the recess 109 of the monocular scope attachment device 102 determines a viewport comprising the image of the virtual shooting target rendered on the user interface 103a. In accordance with the present disclosure, the positioning of the computer-based device 103 within the recess 109 of the monocular scope attachment device 102 determines a viewport comprising the image of the virtual shooting target rendered on the user interface 103a. On selecting a virtual shooting target, the shooter undertakes target shooting by aiming and shooting at the virtual shooting target. In accordance with the present disclosure, the control elements provided on the default rifle scope 101c enable the shooter to position the default rifle scope 101c in line with the elevation of the displayed virtual shooting target. Further, the control elements provided on the default rifle scope 101c would also enable the shooter to adjust a reticle of the default rifle scope 101c in line with either the wind speed, or wind direction, or both. Further, the control elements provided on the monocular scope attachment device 102 enable the shooter to adjust at least the magnification of the virtual shooting target displayed on the user interface 103a.

The processor—embedded within the computer-based device 103 removably inserted into the recess 109 of the monocular scope attachment device 102—triggers the display of the images of the shooting targets, i.e., the virtual shooting targets, at a variety of shooting distances, thereby simulating the operations of a typical brick and mortar shooting range. In accordance with the present disclosure, when the shooter aims at a virtual shooting target from the default rifle scope 101c, in this case, and pulls the trigger 101b of the firearm 101 to generate a shot, the trigger sensor 120 operably coupled to the trigger 101b of the firearm 101 and the computer-based device 103, detects and transmits the pull event of the trigger 101b to the computer-based device 103. The trigger sensor 120 captures and electronically communicates the pull event to the processor embedded within the computer-based device 103. That is, the trigger sensor 120 provides an input signal to the processor embedded within the computer-based device 103 and instructs the processor to determine the theoretical gunshot trajectory and the positioning of the virtual shooting target. The processor determines the theoretical gunshot trajectory based on the position and orientation of the corresponding firearm 101, determined by the position sensors 119.

The information indicative of the positioning of the virtual shooting target is pre-programmed into the processor. The processor correlates the theoretical gunshot trajectory corresponding to the virtual bullet (shot) fired by the shooter and the positioning of the virtual shooting target, and the values assigned to each of the virtual adjustable parameters such as, for example, humidity, temperature, wind speed, wind direction, gravity, altitude, time of the day, and determines the impact of the shooter's shot on the virtual shooting target, including whether the virtual shooting target was hit or missed; and the location on the virtual shooting target likely to have been impacted by the shot, i.e., the point of impact.

In accordance with the present disclosure, the processor is configured to create a theoretical trajectory that recreates the likely path of the virtual bullet from the muzzle of the firearm 101 to the point of impact on the virtual shooting target displayed on the user interface 103a. The processor, as discussed earlier, correlates the theoretical gunshot trajectory corresponding to every virtual bullet (shot) fired by the shooter and the positioning of the corresponding virtual shooting targets and generates, based on the said correlation, performance metrics indicative of the target-practicing-related performance of the shooter vis-à-vis each shot fired by the shooter at the corresponding virtual shooting targets, and the values of the virtual adjustable parameters governing the characterization of each of the corresponding virtual shooting targets. Such target-practicing-related performance information is rendered viewable on the user interface 103a. FIGS. 2A-2B, in combination, illustrate a perspective view and a side elevation view of the monocular scope attachment device 102 removably attachable to the firearm 101 illustrated in FIG. 1. As illustrated in FIGS. 2A-2B, the monocular scope attachment device 102 is configured as a tubular structure. In accordance with the present disclosure, the monocular scope attachment device 102 comprises a recess 109 for receiving a computer-based device 103, for example, a mobile phone with a user interface 103a and an in-built processor, as illustrated in FIG. 1. The recess 109 is configured to accommodate computer-based devices 103 of varying sizes and shapes.

The monocular scope attachment device 102, in accordance with the present disclosure, comprises an optics system 105 that is a combination of an eyepiece lens 106 and an objective lens 107, for triggering a projection of the virtual shooting targets displayed on the user interface 103a (of the computer-based device 103) onto the default rifle scope 101c attached to the firearm 101. Preferably, the eyepiece lens 106 is a large lens configured to magnify the image displayed on the user interface 103a of the computer-based device 103 inserted into the recess 109 and project the magnified image (of the virtual shooting target) onto the default rifle scope 101c attached to the firearm 101. Preferably, the objective lens 107 is configured to shrink the image displayed on the user interface 103a onto a predetermined image point that is then magnified by the eyepiece lens 106.

Furthermore, the monocular scope attachment device 102, as discussed earlier, may include a control element, for example, a zoom device 108 that is an optical device configured to adjust the magnification of the image of the virtual shooting target displayed on the user interface 103a, thereby allowing the shooter to view the (image of the) virtual shooting target displayed on the user interface 103a at the desired magnification. In accordance with the present disclosure, other control elements, for example, switching the views of the displayed virtual shooting targets, selecting environmental criteria corresponding to the displayed virtual shooting targets, switching between various virtual shooting targets, and the like, are embedded within computer-based device 103.

In accordance with the present disclosure, the processor coordinates with the user interface 103a of the computer-based device 103, the eyepiece lens 105, and the objective lens 107 to project the virtual shooting targets displayed on the user interface 103a onto the default rifle scope 101c attached to the firearm 101.

In accordance with the present disclosure, the recess 109 is positioned at a bottom section of the monocular scope attachment device 102 for accommodating the computer-based device 103 in a flat position, such that the computing device 103 is disposed on the bottom of the monocular scope attachment device 102. And in this case, a mirror is appropriately positioned to render the image of the virtual shooting targets displayed on the user interface 103a onto the optics system 105. In this case, additional components for provisioning additional lighting and image correction are operably coupled to the monocular scope attachment device 102. The monocular scope attachment device 102 is removably attached to the rail 101a of the firearm 101 illustrated in FIG. 1, using a mounting attachment, for example, a Picatinny rail attachment 110. The Picatinny rail attachment 110 snaps the monocular scope attachment device 102 to the rail 101a of the firearm 101.

In accordance with the present disclosure, the monocular scope attachment device 102 mounted on the firearm 101 allows the shooter to practice shooting a variety of virtual shooting targets whose characterization could be dynamically altered by adjusting the values of a plurality of virtual adjustable parameters that govern the illustration (portrayal) of the virtual shooting targets on the user interface 103a.

In accordance with the present disclosure, the monocular scope attachment device 102 is removably mounted onto the firearm 101 accessible to a shooter. The monocular scope attachment device 102 is designed as an attachment to the default rifle scope 101c pre-attached to the firearm 101. The monocular scope attachment device 102 is attached to the distal end of the default rifle scope 101c such that the monocular scope attachment device 102 is always in line with and positioned in front of the default rifle scope 101c. The computer-based device 103, embodying the user interface 103 and the pre-programmed processor, is removably inserted into the recess 109 defined on the monocular scope attachment device 102. When the computer-based device 103 removably inserted into the recess 109 of the monocular scope attachment device 102 is powered on, it displays on the user interface 103a a three-dimensional image representing a virtual shooting target. Preferably, the processor is configured to create a plurality of images representing virtual shooting targets embodying diversified characterizing parameters, for example, the elevation of the virtual shooting target, wind speed, wind direction, zoom range, temperature, time of day, the shape of the virtual shooting target, type of the virtual shooting target, shooting distance, range of motion associated with the virtual shooting target, humidity, altitude, and response provided by the virtual shooting target on being shot. Preferably, the user interface 103a is pre-programmed to display only one virtual shooting target at any given point of time and enable the shooter to switch between the images of various virtual shooting targets iteratively and thereby view a variety of virtual shooting targets embodying diversified characterizing parameters.

In accordance with the present disclosure, subsequent to the display of a predetermined virtual shooting target on the user interface 103a, the shooter visualizes the displayed virtual shooting target and takes aim at the displayed virtual shooting target through the default rifle scope 101c. Further, the shooter fires a virtual bullet by pulling the trigger 101b of his firearm 101, subsequent to visualizing the displayed virtual shooting target through the default rifle scope 101c. The orientation and position of firearm 101 are determined by a gyroscope and an accelerometer (positional sensors 119) embedded within the firearm 101. The orientation-related information and the position-related information corresponding to the firearm 101 are relayed onto the processor embedded within the computer-based device 103 removably inserted into the recess 109 of the monocular scope attachment device 102.

Similarly, the processor is also provided with access to the information indicative of the virtual positioning of the virtual shooting target within the virtual target-shooting environment. The processor subsequently correlates the orientation-related information and the position-related information corresponding to the firearm 101 with the information indicative of the positioning of the virtual shooting target within the virtual target-shooting environment and creates a theoretical trajectory corresponding to the virtual bullet fired by the shooter.

The processor, based on the theoretical trajectory corresponding to the virtual bullet fired by the shooter, and further based on the orientation-related information and the position-related information corresponding to the firearm 101, and the information indicative of the positioning of the virtual shooting target within the virtual target-shooting environment, identifies a point on the virtual shooting target that could have likely been impacted by the virtual bullet. Subsequently, the processor determines the distance between the point of impact and the predetermined center point of the virtual shooting target. And this procedure is repeated for every shot fired by the shooter from his firearm 101, at the virtual shooting target displayed on the user interface 103a.

Preferably, every shooter is allowed twelve shots at a particular virtual shooting target. After the shooter finishes his quota of twelve shots, the processor determines the point of impacts corresponding to each of the shots (i.e., each of the twelve shots) taken by the shooter against the predetermined virtual shooting target. Further, the processor determines the accuracy corresponding to the shots fired by the shooter, based on the mutual distance between each of the (virtual) points of impact created by the shots (virtually) fired by the shooter. Typically, the shorter the mutual distance between each of the points of impact, the higher will be the accuracy score, and the higher the mutual distance between each of the points of impact, the lower will be the accuracy score. Preferably, the accuracy score is described as a percentage value.

Further, the processor determines the consistency corresponding to the shots fired by the shooter, based on the distance between a predetermined center point of the virtual shooting target and each of the (virtual) points of impact created by the shots (virtually) fired by the shooter. Typically, the shorter the distance between each of the points of impact and the predetermined center point, higher will be the consistency score. And typically, more the number of shots landing closer to the predetermined center point, the higher will be consistency score. And, if the number of shots landing away from the predetermined center point is higher, then the consistency score will be comparatively lower. And, the higher the distance between each of the points of impact and the predetermined center point, the lower will be the consistency score. Preferably, the consistency score is also described as a percentage value.

Preferably, when a virtual shooting target is rendered viewable to the shooter on the user interface 103a, the virtual shooting target so rendered is characterized by a plurality of virtual adjustable parameters. The plurality of virtual parameters characterizing the virtual shooting targets includes the elevation associated with the virtual shooting target, wind speed, wind direction, zoom range, temperature, time of day, the shape of the virtual shooting target, type of the virtual shooting target, shooting distance, range of motion associated with the virtual shooting target, humidity, altitude, and response provided by the virtual shooting target on being shot.

Preferably, when the virtual shooting target is rendered on the user interface 103a for the first time or before the shooter takes his first virtual shot, each of the aforementioned virtual parameters is assigned a predetermined value. For instance, the parameters including 'temperature,' 'time of the day,' 'altitude,' and 'shooting distance' could be programmatically associated with corresponding predetermined values.

For example, a value assigned to the parameter 'temperature' affects the trajectory of the shots fired, for shots fired in a colder temperature travel slower than their counterparts fired in a warm temperature. Also, colder temperature means increased bullet drop, increased wind deflection, reduced energy delivery to the intended target. In this case, the processor specifically takes into account the value assigned to the parameter 'temperature,' and the effect the value assigned to the parameter 'temperature' is likely to exhibit on the theoretical trajectory of the corresponding virtual bullet, i.e., the possibility of the virtual bullet traveling slower and the possibility of bullet drop, while calculating the theoretical trajectory for the corresponding shot. Referring to the example of the parameter 'temperature,' any value assigned to the parameter 'temperature' will have a bearing not only on the theoretical trajectory of the corresponding bullet shot but also the accuracy and consistency exhibited by the shooter in shooting at the virtual shooting target, for the theoretical trajectory of the bullet directly influences the point of impact on the displayed virtual shooting target and, in turn, the accuracy and consistency exhibited by the shooter in shooting at the virtual shooting target.

Likewise, a value assigned to the parameter 'time of the day' affects the visibility of the shooting target since accurately visualizing a shooting target is far easier in the day than at night. Also, accurately visualizing a shooting target is far easier early in the morning than in the peak afternoon, since during peak afternoons, the sun is at its brightest, thus creating a reflective effect on the shooting scope. In this case, the processor specifically takes into account the value assigned to the parameter 'time of the day,' and the effect the value assigned to the parameter 'time of the day,' and, in turn, the target visibility is likely to exhibit on the theoretical trajectory of the corresponding shot. Referring to the example of the parameter 'time of the day,' any value assigned to the parameter 'time of the day' will have a bearing not only on the theoretical trajectory of the corresponding bullet shot but also on the accuracy and consistency exhibited by the shooter in shooting at the virtual shooting target, for the theoretical trajectory of the bullet directly influences the point of impact on the displayed virtual shooting target and, in turn, the accuracy and consistency exhibited by the shooter in shooting at the virtual shooting target.

Likewise, a value assigned to the parameter 'attitude' affects the distance a bullet travels. The higher the altitude, the higher will be the friction caused by air, and less will be the distance traveled by the bullet. Also, the distance traveled by a bullet, albeit virtual, will have a significant impact on the consistency and accuracy associated with the shot. A longer travel distance for a bullet is likely to reduce the accuracy and consistency associated with the corresponding bullet shot, whereas a shorter travel distance for a bullet may bring about an improvement in the accuracy and consistency associated with the corresponding bullet shot. In this case, the processor specifically takes into account the value assigned to the parameter 'altitude,' and the effect the value assigned to the parameter 'altitude' is likely to exhibit on the theoretical trajectory of the corresponding virtual bullet, i.e., the possibility of the virtual bullet traveling relatively shorter distances, since the theoretical trajectory of the bullet directly influences the point of impact on the displayed virtual shooting target and, in turn, the accuracy and consistency exhibited by the shooter in shooting at the virtual shooting target.

Likewise, a value assigned to the parameter 'shooting distance,' again, affects the distance traveled by a bullet. The higher the shooting distance, the higher will be the distance of travel for the bullet. Lower the shooting distance, lower will be the distance of travel for the bullet. And as discussed above, a longer travel distance for a bullet is likely to reduce the accuracy and consistency associated with the corresponding bullet shot, whereas a shorter travel distance for a bullet may bring about an improvement in the accuracy and consistency associated with the corresponding bullet shot. In this case, the processor specifically takes into account the value assigned to the parameter 'shooting distance.' and the effect the value assigned to the parameter 'shooting distance' is likely to exhibit on the theoretical trajectory of the corresponding virtual bullet, i.e., the possibility of the virtual bullet traveling relatively shorter distances and relatively long distances, since the theoretical trajectory of the bullet directly influences the point of impact on the displayed virtual shooting target and, in turn, the accuracy and consistency exhibited by the shooter in shooting at the virtual shooting target.

In accordance with the present disclosure, as discussed above, as soon as the shooter completes his first shot at the virtual shooting target, the processor, using the procedure discussed hitherto, calculates the accuracy associated with the first shot of the shooter. And, in accordance with the present disclosure, the microcontroller employs a reinforcement learning approach, wherein the processor correlates the accuracy score associated with the first shot taken by the shooter and the values assigned to the parameters—i.e., temperature, time of the day, altitude, and shooting distance, in this exemplary case—that characterized the virtual shooting target when the shooter took his first shot. And subsequently, the processor correlates the accuracy score associated with each of the shots taken by the shooter and the values assigned to the parameters (in this exemplary case, the temperature, time of the day, altitude, and shooting distance) characterizing each of the corresponding virtual shooting targets.

In this manner, the processor learns a) the accuracy scores corresponding to 'twelve' shots taken by the shooter, b) the parameters that characterized the virtual shooting target during each of the twelve shots taken by the shooter, c) the increments and decrements inflicted upon the values assigned to the parameters after completion of each of the twelve shots, and d) a correlation between the increments and decrements of the parameter values after completion of each of the twelve shots and the accuracy value observed at the completion of each of the twelve shots. The processor, in accordance with the present disclosure, applies the said learning to determine how increments and decrements introduced into the parameter values after the completion of a shot would affect the accuracy score of a succeeding shot. And in this manner, the processor, based on predetermined reinforcement learning procedures, determines how increments and decrements introduced into certain parameters (for example, temperature, time of the day, altitude, and shooting distance, in this case) characterize the virtual shooting target affect the accuracy with which the shooter hits the virtual shooting target.

In accordance with an exemplary embodiment of the present disclosure, with predetermined values set for the parameters 'gravity' and 'wind speed,' the shooter is enabled to take his first shot at the virtual shooting target. For the sake of explanation, it is assumed that the virtual shooting target, before the first shot, is characterized by low wind speed and low gravity. And now, the processor allows the shooter to take his first shot. After the completion of the first shot and after computing the accuracy score as described above, the processor may decide, based on the accuracy score, to either increase the values of the parameters 'gravity' and 'wind speed,' or decrease the values of the parameters 'gravity' and 'wind speed,' or to keep the values of the parameters 'gravity' and 'wind speed' intact and digress to adjusting any of the remaining parameters. For instance, after the first shot, if the accuracy score is above ninety percent, the processor may increment the values of the parameters 'gravity' and 'wind speed' and redefine the (image of) the virtual shooting target based on the incremented values assigned to the parameters 'gravity' and 'wind speed,' and allow the shooter to take a second shot.

Further, after the completion of the second shot, if the accuracy score remains above or very close to 'ninety percent,' which was the accuracy score associated with the first shot of the shooter, then the processor may increment the values of the parameters 'gravity' and 'wind speed' and yet again redefine the (image of) the virtual shooting target based on the incremented values assigned to the parameters 'gravity' and 'wind speed,' before allowing the shooter his third shot. On the contrary, if the accuracy score for the second shot is determined to be below 'sixty percent,' then the processor may decrement the values of the parameters 'gravity' and 'wind speed,' and yet again redefine the (image of) the virtual shooting target based on the decremented values assigned to the parameters 'gravity' and 'wind speed.'

And in this manner, the processor selectively increments and decrements the values assigned to the parameters characterizing the virtual shooting target displayed to the shooter (on the user interface 103a), based on the accuracy score determined for every shot undertaken by the shooter. And if the accuracy scores corresponding to every shot taken by the shooter remains on a positive trajectory (i.e., increase from shot to shot), the processor will selectively increment and decrement predetermined parameters values characterizing the virtual shooting target, thereby characterizing the virtual shooting target with greater levels of complexity, for example, associating higher wind speeds, higher altitude, lower target visibility, and higher gravity with the virtual shooting target, such that hitting the virtual shooting target with higher accuracy becomes progressively difficult and challenging, and such that sustaining the positive accuracy score across multiple shots becomes equally difficult and challenging for the shooter. Preferably, this procedure is repeated until the shooter fires a predetermined of shots at the virtual shooting target or until the shooter succeeds in scoring an accuracy score greater than a predetermined threshold level.

On the other hand, if the accuracy scores corresponding to every shot taken by the shooter follow a negative trajectory, then the processor will selectively increment and decrement predetermined parameter values characterizing the virtual shooting target, such that accurately hitting the virtual shooting target becomes progressively easier. For example, if the processor retains both the wind speed and gravity at a lower value while incrementing the values associated with target visibility, then it is comparatively easy for the shooter to hit the virtual shooting target that has been characterized by lower wind speed, lower gravity, and higher visibility. And in this manner, by selectively incrementing and decrementing predetermined parameter values such that the complexity associated with the characterization of the virtual shooting target is gradually reduced, the processor enables the shooter to achieve higher accuracy scores progressively and to progress from a negative accuracy score-related trajectory to a positive accuracy score-related trajectory.

And in this manner, for every shot taken at the virtual shooting target, and based on the accuracy score associated with every such shot, the processor selectively increments and decrements the values corresponding to each of the parameters characterizing the virtual shooting target, such that the shooter is enabled to practice hitting the (virtual) targets under varying virtual environmental conditions and learn to hit targets with increased accuracy, the varying environmental conditions notwithstanding.

In accordance with the present disclosure, after each shot is taken, the processor selectively increments and decrements the values of the parameters characterizing the virtual shooting target such that for every shot taken up by the shooter, the corresponding virtual shooting target entails varying characteristics, driven by the said characterizing parameters. For instance, if a first shot is taken with low visibility, then the processor adjusts the value of the parameter 'visibility' such that the next shot is taken with moderate visibility. And, if the shooter scores a higher accuracy score against the virtual shooting target embodying moderate visibility and continues to do so for a predetermined number of shots, then the processor may decide that the shooter has attained enough proficiency to operate under low visibility conditions and leave the value of the parameter 'visibility' unchanged from the previous shot, and instead chose to increment or decrement another parameter value selectively, for example, gravity. And after the completion of a predetermined number of shots, if the processor determines, basis the corresponding accuracy score, that the shooter has attained enough proficiency in operating under high gravity conditions, it may leave the value of the parameter 'visibility' unchanged from the previous shot, and instead chose to increment or decrement another parameter value selectively, for example, the elevation corresponding to the virtual shooting target. And in this manner, the processor familiarizes the shooters with a variety of parameters characterizing the virtual shooting target, varying parameter values iteratively assigned to each of the parameters, and the resultant varying environmental conditions and the corresponding complexities that influence the manner in which a (virtual) shooting target is visualized and shot.

In accordance with the present disclosure, as discussed above, as soon as the shooter completes his first shot at the virtual shooting target, the processor, using the procedure discussed hitherto, calculates the accuracy associated with the first shot of the shooter. However, to determine the consistency with which the shooter hits the virtual shooting target, the processor waits until the shooter completes a predetermined number of shots, and preferably, in this case, twelve shots. Soon after the shooter completes twelve shots, the processor determines the consistency corresponding to the shots fired by the shooter, based on the distance between a predetermined center point of the virtual shooting target and each of the (virtual) points of impact created by the shots (virtually) tired by the shooter.

And, in accordance with the present disclosure, the processor employs a reinforcement learning approach, wherein the processor is pre-programmed with legacy information indicative of the relationship between the values assigned to the parameters that characterized the virtual shooting target and the corresponding consistency scores. For instance, the processor may be pre-programmed, preferably during a training stage, with the information that when the parameters 'altitude' and 'shooting distance' are assigned values ranging between 'very low' and 'moderately low,' the corresponding consistency score always ends up being high, for example, close to ninety percent. Likewise, the processor may be pre-programmed, preferably during the training stage, with the information that whenever the parameters 'gravity' and 'wind speed' are assigned values ranging between 'high' and 'very high,' the corresponding consistency score always ended up being low.

In accordance with the present disclosure, the processor, equipped with the information indicative of the correlation between the consistency score and the values assigned to the parameters characterizing the virtual shooting target, may iteratively adjust the values of certain parameters such that the shooter is exposed more to those parameters that are deemed likely to have a negative impact on the consistency score. For instance, since the processor is aware that when the values of parameters 'altitude' and 'shooting distance' range between 'very low' and 'moderately low,' the consistency score corresponding to the twelve shots taken under such 'very low' to 'moderately low' altitude and shooting distance-related conditions always remains high, the processor decides to leave the increment the values of parameters 'altitude' and 'shooting distance' for the next set of 'twelve' shots—such that the complexity of visualizing and hitting the next twelve shots becomes progressively difficult given the progressive increments to the values of the parameters 'altitude' and 'shooting distance'—and also simultaneously concentrate on the values assignable to the parameter 'gravity.'

And, with the value of 'gravity' set to 'high' and the values of parameters 'altitude' and 'shooting distance' ranging between 'very low' to 'moderately low' for the next 'twelve' shots, if the consistency score, after the completion of the (next) twelve shots embodying the aforementioned values (gravity-high; altitude-very low; shooting distance-moderately low), returns a comparatively lower value, then the processor determines that the shooter is not comfortable shooting with higher gravity levels. In response, the processor may set the value of the parameter 'gravity' to 'very low' and set the values of the parameters 'altitude' and 'shooting distance' to 'high.' With the value of the parameter 'gravity' set to 'very low,' and the values of the parameters 'altitude' and 'shooting distance' set to 'high,' if the consistency score after the completion of the next twelve shots with the aforementioned values (i.e., gravity-very low; altitude-high; shooting distance-high) returns yet another lower value, then the processor determines that the shooter is not proficient in shooting under high altitude conditions and longer shooting distances, the significant reduction in the rate of gravity notwithstanding. And therefore, under such a scenario, the processor decides to iteratively tweak only the values of the parameters 'gravity,' 'altitude,' and 'shooting distance,' such that the shooter becomes proficient in shooting under conditions involving varying levels of gravity, altitude, and shooting distance.

Further, in accordance with the present disclosure, if the shooter takes twelve shots at a static virtual shooting target and achieves a consistency score above ninety percent, the processor may, after monitoring the shooter's shots and the corresponding consistency score, decide to provide him with a vertically moving virtual shooting target for the next twelve shots. Likewise, when the shooter completes twelve shots with 'gravity,' 'altitude,' and 'shooting distance,' set to 'high,' the processor may, based on the corresponding consistency score, decide to provide him with a virtual shooting target that embodies comparatively lower gravity, lower altitude, and lower shooting distance, for the next twelve shots. And in this manner, based on the consistency scores, the processor provides a shooter with access to different types of virtual shooting targets and enables him to practice hitting the shooting targets under varying conditions with improved consistency.

In accordance with the present disclosure, while the processor calculates the accuracy score for every shot fired by the shooter at the virtual shooting target, the consistency score is calculated, by the processor, only after the shooter completes twelve shots. And it is possible that the parameters characterizing the virtual shooting target are iteratively adjusted for every shot taken by the shooter (other than the first shot) if such parameters are adjusted, by the processor, on the basis of only the accuracy score. Further, the processor is also configured to iteratively adjust the values assigned to the parameters characterizing the virtual shooting target based on the consistency score. In such a case, the parameters are iteratively adjusted based on the consistency score only after the completion of twelve shots by the shooter. Further, it is also possible that the first set of parameters characterizing the virtual shooting target is iteratively adjusted for every shot, based on the corresponding accuracy scores, and the second set of parameters characterizing the virtual shooting target is iteratively adjusted only after the completion of twelve shots and based on the corresponding consistency score.

Figure 3:
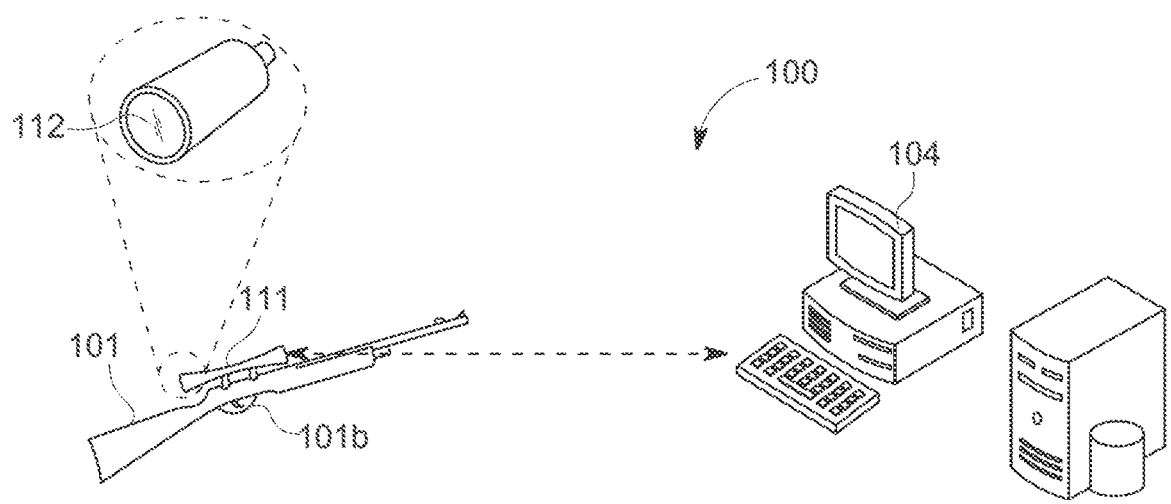

In accordance with the present disclosure, FIG. 3 illustrates a monocular scope device 111 attached to the firearm 101, without the default rifle scope 101c illustrated in FIG. 1. In this case, the monocular scope device 111 is removably attached to the rail 101a of firearm 101. In this case, the monocular scope device 111 replaces the default rifle scope 101c of the firearm 101 illustrated in FIG. 1. In accordance with the present disclosure, the monocular scope device 111 is a self-contained display device configured as a scope. The monocular scope device 111 is configured to be mounted on a chassis rail 101a of the firearm 101 as a replacement to the default rifle scope 101c. The monocular scope device 111 has a form factor similar to the default rifle scope 101c, with control elements embedded thereon for adjusting parameters, including elevation, windage, and zoom.

Figure 4A:
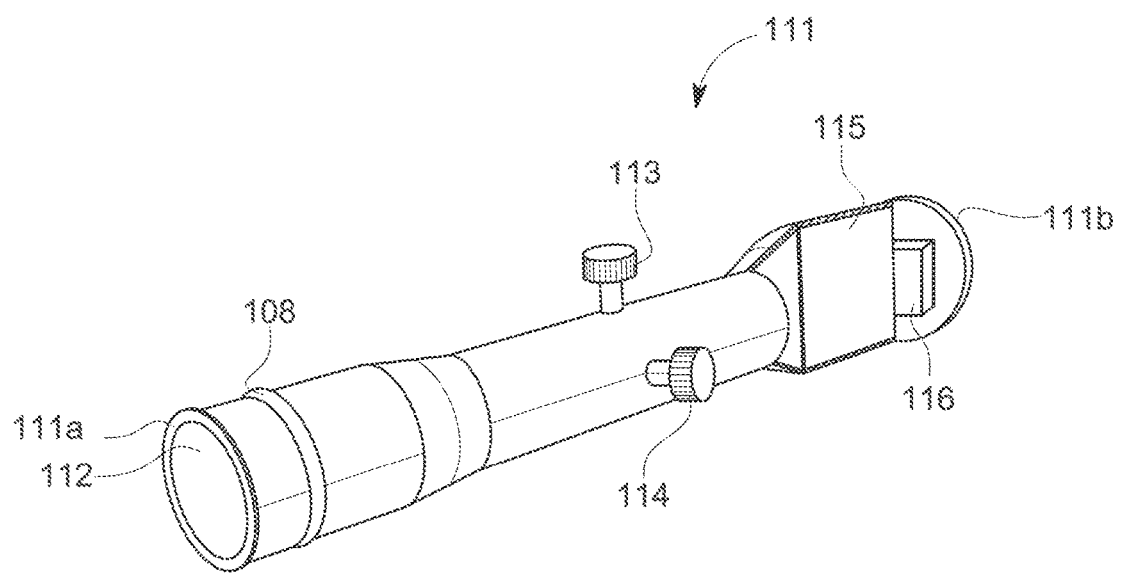

The monocular scope device 111 comprises a single built-in micro-display unit 112 as illustrated in FIGS. 4A-4B, and an optical processing unit (not shown in figures), which, in combination, generates and displays a plurality of virtual shooting targets. In accordance with the present disclosure, a computer-based device, for example, a microcomputer (not shown in figures), is embedded into the monocular scope device 111. In accordance with the present disclosure, the microcomputer embedded within the monocular scope device 111 is configured to communicate with an external computing device, for example, a controller device 104 as illustrated in FIG. 3, via a network, for example, a Bluetooth® communication network. Furthermore, position sensors are operably coupled to the microcomputer built into the monocular scope device 111. A shooter may switch from one virtual shooting target to another and selectively adjust the parameters characterizing the virtual shooting targets by using the controller device 104 in operable communication with the monocular scope device 111.

The microcomputer embedded within the monocular scope device 111 engine generates a three-dimensional (3D) model of the virtual shooting targets, as illustrated in the detailed description of FIG. 1. The microcomputer triggers a display of the virtual shooting targets on the micro-display unit 112. The shooter is enabled to view the virtual shooting targets displayed on the micro-display unit 112 from an eye-piece located at the proximal end of the monocular scope device 111. The monocular scope device 111 and the construction and components thereof are also illustrated in FIGS. 4A-4B. The microcomputer embedded within the monocular scope device 111 engine generates a three-dimensional (3D) model of the virtual shooting targets, as illustrated in the detailed description of FIG. 1. The microcomputer triggers a display of the virtual shooting targets on the micro-display unit 112. The shooter is enabled to view the virtual shooting targets displayed on the micro-display unit 112 from an eye-piece located at the proximal end of the monocular scope device 111. When the shooter aims at a virtual shooting target displayed on the micro-display unit 112 and pulls the trigger 101b of the firearm 101 to generate a shot, the trigger sensor 120 operably coupled to the trigger 101b of the firearm 101, and the microcomputer detects and transmits the pull event of the trigger 101b to the microcomputer.

FIGS. 4A-4B illustrate a partial cutaway, perspective view, and a side elevation view of the monocular scope device 111 attachable to the firearm 101 illustrated in FIG. 3. As illustrated in FIGS. 4A-4B, the monocular scope device 111 is configured as a tubular structure with a mounting attachment (not shown). The monocular scope device 111 comprises a micro-display unit 112, control elements, for example, a zoom device 108, an elevation knob 113, and a windage knob 114, and a battery-powered microcomputer (not shown in figures).

The micro-display unit 112 is positioned at the distal end 111a of the monocular scope device 111. The micro-display unit 112 displays the virtual shooting targets generated by the microcomputer. The shooter visualizes the virtual shooting targets through the micro-display unit 112. The zooming device 108 is fitted with an encoder and is configured to operate electronically in the monocular scope device 111. The adjustments of the elevation knob 113 and the windage knob 114 are relayed to the battery-powered microcomputer of the monocular scope device 111 through encoders. The elevation knob 113 allows the shooter to adjust elevation for shooting a virtual shooting target. The windage knob 114 allows the shooter to adjust windage, that is, how far right or left a projectile strikes the virtual shooting target. The elevation knob 113 and the windage knob 114 adjust a reticle and assist the shooter in matching an aiming point of the firearm 101 with crosshairs of the reticle.

In accordance with the present disclosure, other control elements, for example, a power on/off button for powering on the monocular scope device 111; a reset button for restarting the monocular scope device 111; a pairing button for initiating or accepting a pairing request from the controller device 104 illustrated in FIG. 3; a focal plane toggle switch for switching views between a first focal plane and a second focal plane; and the like are provided on the monocular scope device 111.

The battery-powered microcomputer receives inputs corresponding to the scope adjustments made through the control elements 108, 113, and 114 and the trigger sensor 120 operably coupled to the trigger 101b of the firearm 101. The microcomputer drives the micro-display unit 112. The microcomputer comprises a microcontroller embedded in a printed circuit board (PCB) 115 and is powered by an energy storage device 116. The microcontroller embedded in the PCB 115 operates the peripherals, for example, the micro-display unit 112, the encoders, a wireless communication module such as a Bluetooth® communication module that communicates with the controller device 104, and the like, of the monocular scope device 111. For example, the energy storage device 116 is configured, like a battery pack, to supply power to the peripherals of the monocular scope device 111. Preferably, the energy storage device 116 is positioned at a proximal end 111b of the monocular scope device 111. The microcomputer comprises a storage device configured to store a plurality of images of pre-configured virtual shooting targets. Through a wireless communication protocol, for example, the Bluetooth® communication protocol, different virtual shooting targets could be pushed to the microcomputer from the controller device 104. The gyroscope and accelerometer position of the monocular scope device 111 determine the orientation and position of the firearm 101, particularly the monocular scope device 111, with reference to the position of the virtual shooting target displayed on the micro-display unit 112.

The monocular scope device 11 mounted on the firearm 101 allows the shooter to practice in hitting different virtual shooting targets embodying different characterizing parameters and varying levels of shooting accuracy and consistency-related complexities. The monocular scope device 111 may be used by shooters who prefer to view the virtual shooting targets through one eye while keeping the other eye closed. With the monocular scope device 11l mounted on the firearm 101, the shooter may aim with only one open eye, for example, the dominant eye.

In accordance with the present disclosure, the monocular scope device 111 is removably mounted onto the firearm 101 accessible to a shooter. The monocular scope device 111 is designed as a replacement for the default rifle scope 101c that is otherwise attached to the firearm 101. The monocular scope device 111 is embedded with a battery-powered microcontroller (not shown in figures) that, in combination with the micro-display unit 112 embedded within the monocular scope device 111, displays on the micro-display unit 112 a three-dimensional image representing a virtual shooting target.

Preferably, the microcomputer (embedded within the monocular scope device 111) is configured to create a plurality of images representing virtual shooting targets embodying diversified characterizing parameters, for example, the elevation of the virtual shooting target, wind speed, wind direction, zoom range, temperature, time of day, the shape of the virtual shooting target, type of the virtual shooting target, shooting distance, range of motion associated with the virtual shooting target, humidity, altitude, and response provided by the virtual shooting target on being shot. Preferably, the micro-display unit 112 is pre-programmed to display only one virtual shooting target at any given point of time and to enable the shooter to iteratively switch between the images of various virtual shooting targets and thereby view a variety of virtual shooting targets embodying diversified characterizing parameters.

In accordance with the present disclosure, subsequent to the display of a predetermined virtual shooting target on the micro-display unit 112, the shooter visualizes the displayed virtual shooting target and takes aim at the displayed virtual shooting target through the monocular scope device 111. Further, the shooter fires a virtual bullet by pulling the trigger 101b of his firearm 101, subsequent to visualizing the displayed virtual shooting target through the monocular scope device 111. The orientation and position of the firearm 101 are determined by a gyroscope and an accelerometer (positional sensors 119) embedded within the monocular scope device 111. The orientation-related information and the position-related information corresponding to firearm 101 are relayed onto the microcontroller (embedded within the monocular scope device 111).

Similarly, the microcontroller is also provided with access to the information indicative of the virtual positioning of the virtual shooting target within the virtual target-shooting environment. The microcontroller subsequently correlates the orientation-related information and the position-related information corresponding to the firearm 101 with the information indicative of the positioning of the virtual shooting target within the virtual target-shooting environment and creates a theoretical trajectory corresponding to the virtual bullet fired by the shooter.

The processor, based on the theoretical trajectory corresponding to the virtual bullet fired by the shooter, and further based on the orientation-related information and the position-related information corresponding to the firearm 101, and the information indicative of the positioning of the virtual shooting target within the virtual target-shooting environment, identifies a point on the virtual shooting target that could have likely been impacted by the virtual bullet. Subsequently, the processor determines the distance between the point of impact and the predetermined center point of the virtual shooting target. And this procedure is repeated for every shot fired by the shooter from his firearm 101 at the virtual shooting target displayed on the micro-display unit 112.

Preferably, every shooter is allowed twelve shots at a particular virtual shooting target. After the shooter finishes his quota of twelve shots, the microcomputer determines the point of impacts corresponding to each of the shots (i.e., each of the twelve shots) taken by the shooter against the predetermined virtual shooting target. Further, the microcomputer determines the accuracy corresponding to the shots fired by the shooter, based on the mutual distance between each of the (virtual) points of impact created by the shots (virtually) fired by the shooter. Further, the microcomputer determines the consistency corresponding to the shots fired by the shooter, based on the distance between a predetermined center point of the virtual shooting target and each of the (virtual) points of impact created by the shots (virtually) fired by the shooter.

Preferably, when a virtual shooting target is rendered viewable to the shooter on the micro-display unit 112, the virtual shooting target so generated is characterized by a plurality of virtual adjustable parameters. The plurality of virtual parameters characterizing the virtual shooting targets includes elevation associated with the virtual shooting target, wind speed, wind direction, zoom range, temperature, time of day, the shape of the virtual shooting target, type of the virtual shooting target, shooting distance, range of motion associated with the virtual shooting target, humidity, altitude, and response provided by the virtual shooting target on being shot.

Preferably, when the virtual shooting target is rendered on the micro-display unit 112 for the first time or before the shooter takes his first virtual shot, each of the aforementioned virtual parameters is assigned a predetermined value. For instance, the parameters including 'temperature,' 'time of the day,' 'altitude,' and 'shooting distance' could be programmatically associated with corresponding predetermined values.

For example, a value assigned to the parameter 'temperature' affects the trajectory of the shots fired, for shots fired in a colder temperature travel slower than their counterparts fired in a warm temperature. Also, colder temperature means increased bullet drop, increased wind deflection, reduced energy delivery to the intended target. In this case, the microcomputer specifically takes into account the value assigned to the parameter 'temperature,' and the effect the value assigned to the parameter 'temperature' is likely to exhibit on the theoretical trajectory of the corresponding virtual bullet, i.e., the possibility of the virtual bullet traveling slower and the possibility of bullet drop, while calculating the theoretical trajectory for the corresponding shot. Typically, any value assigned to the parameter 'temperature' will have a bearing not only on the theoretical trajectory of the corresponding bullet shot but also the accuracy and consistency exhibited by the shooter in shooting at the virtual shooting target, for the theoretical trajectory of the bullet directly influences the point of impact on the displayed virtual shooting target and, in turn, the accuracy and consistency exhibited by the shooter in shooting at the virtual shooting target.

Likewise, a value assigned to the parameter 'time of the day' affects the visibility of the shooting target since accurately visualizing a shooting target is far easier in the day than at night. Also, accurately visualizing a shooting target is far easier early in the morning than in the peak afternoon, since during peak afternoons, the sun is at its brightest, thus creating a reflective effect on the shooting scope. In this case, the microcontroller specifically takes into account the value assigned to the parameter 'time of the day,' and the effect of the value assigned to the parameter 'time of the day,' and, in turn, the target visibility is likely to exhibit on the theoretical trajectory of the corresponding shot. Typically, any value assigned to the parameter 'time of the day' will have a bearing not only on the theoretical trajectory of the corresponding bullet shot but also the accuracy and consistency exhibited by the shooter in shooting at the virtual shooting target, for the theoretical trajectory of the bullet directly influences the point of impact on the displayed virtual shooting target and, in turn, the accuracy and consistency exhibited by the shooter in shooting at the virtual shooting target.

Likewise, a value assigned to the parameter 'altitude' affects the distance a bullet travels. The higher the altitude, the higher will be the friction caused by air, and less will be the distance traveled by the bullet. Also, the distance traveled by a bullet, albeit virtual, will have a significant impact on the consistency and accuracy associated with the shot. A longer travel distance for a bullet is likely to reduce the accuracy and consistency associated with the corresponding bullet shot, whereas a shorter travel distance for a bullet may bring about an improvement in the accuracy and consistency associated with the corresponding bullet shot. In this case, the microcontroller specifically takes into account the value assigned to the parameter 'altitude,' and the effect the value assigned to the parameter 'altitude' is likely to exhibit on the theoretical trajectory of the corresponding virtual bullet, i.e., the possibility of the virtual bullet traveling relatively shorter distances, since the theoretical trajectory of the bullet directly influences the point of impact on the displayed virtual shooting target and, in turn, the accuracy and consistency exhibited by the shooter in shooting at the virtual shooting target.

Likewise, a value assigned to the parameter 'shooting distance.' again, affects the distance traveled by a bullet. The higher the shooting distance, the higher will be the distance of travel for the bullet. Lower the shooting distance, lower will be the distance of travel for the bullet. And as discussed above, a longer travel distance for a bullet is likely to reduce the accuracy and consistency associated with the corresponding bullet shot, whereas a shorter travel distance for a bullet may bring about an improvement in the accuracy and consistency associated with the corresponding bullet shot. In this case, the microcontroller specifically takes into account the value assigned to the parameter 'shooting distance,' and the effect the value assigned to the parameter 'shooting distance' is likely to exhibit on the theoretical trajectory of the corresponding virtual bullet, i.e., the possibility of the virtual bullet traveling relatively shorter distances and relatively long distances, since the theoretical trajectory of the bullet directly influences the point of impact on the displayed virtual shooting target and, in turn, the accuracy and consistency exhibited by the shooter in shooting at the virtual shooting target.

In accordance with the present disclosure, as discussed above, as soon as the shooter completes his first shot at the virtual shooting target, the microcontroller, using the procedure discussed hitherto, calculates the accuracy associated with the first shot of the shooter. And, in accordance with the present disclosure, the microcontroller employs a reinforcement learning approach, wherein the microcomputer correlates the accuracy score associated with the first shot taken by the shooter and the values assigned to the parameters—i.e., temperature, time of the day, altitude, and shooting distance, in this exemplary case—that characterized the virtual shooting target when the shooter took his first shot. And subsequently, the microcontroller correlates the accuracy score associated with each of the shots taken by the shooter and the values assigned to the parameters (in this exemplary case, the temperature, time of the day, altitude, and shooting distance) characterizing each of the corresponding virtual shooting targets.

In this manner, the microcontroller learns a) the accuracy scores corresponding to 'twelve' shots taken by the shooter, b) the parameters that characterized the virtual shooting target during each of the twelve shots taken by the shooter, c) the increments and decrements inflicted upon the values assigned to the parameters after completion of each of the twelve shots, and d) a correlation between the increments and decrements of the parameter values after completion of each of the twelve shots and the accuracy value observed at the completion of each of the twelve shots. The microcomputer, in accordance with the present disclosure, applies the said learning to determine how increments and decrements introduced into the parameter values after the completion of a shot would affect the accuracy score of a succeeding shot. And in this manner, the microcontroller, based on predetermined reinforcement learning procedures, determines how increments and decrements introduced into certain parameters (for example, temperature, time of the day, altitude, and shooting distance, in this case) characterize the virtual shooting target affect the accuracy with which the shooter hits the virtual shooting target.

In accordance with an exemplary embodiment of the present disclosure, with predetermined values set for the parameters 'gravity' and 'wind speed,' the shooter is enabled to take his first shot at the virtual shooting target. For the sake of explanation, it is assumed that the virtual shooting target, before the first shot, is characterized by low wind speed and low gravity. And now, the microcontroller allows the shooter to take his first shot. After the completion of the first shot and after computing the accuracy score as described above, the microcontroller may decide, based on the accuracy score, to either increase the values of the parameters 'gravity' and 'wind speed,' or decrease the values of the parameters 'gravity' and 'wind speed,' or to keep the values of the parameters 'gravity' and 'wind speed' intact and digress to adjusting any of the remaining parameters. For instance, after the first shot, if the accuracy score is above 'ninety percent,' the microcontroller may increment the values of the parameters 'gravity' and 'wind speed,' and redefine the (image of) the virtual shooting target based on the incremented values assigned to the parameters 'gravity' and 'wind speed,' and allow the shooter to take a second shot.

Further, after the completion of the second shot, if the accuracy score remains above or very close to 'ninety percent,' which was the accuracy score associated with the first shot of the shooter, then the microcontroller may increment the values of the parameters 'gravity' and 'wind speed' and yet again redefine the (image of) the virtual shooting target based on the incremented values assigned to the parameters 'gravity' and 'wind speed,' before allowing the shooter his third shot. On the contrary, if the accuracy score for the second shot is determined to be below 'sixty percent,' then the microcontroller may decrement the values of the parameters 'gravity' and 'wind speed,' and yet again redefine the (image of) the virtual shooting target based on the decremented values assigned to the parameters 'gravity' and 'wind speed.'

And in this manner, the microcomputer selectively increments and decrements the values assigned to the parameters characterizing the virtual shooting target displayed to the shooter (on the micro-display unit 112), based on the accuracy score determined for every shot undertaken by the shooter. And suppose the accuracy scores corresponding to every shot taken by the shooter remain on a positive trajectory (i.e., increase from shot to shot). In that case, the microcontroller will selectively increment and decrement predetermined parameters values characterizing the virtual shooting target, thereby characterizing the virtual shooting target with greater levels of complexity, for example, associating higher wind speeds, higher altitude, lower target visibility, and higher gravity with the virtual shooting target, such that hitting the virtual shooting target with higher accuracy becomes progressively difficult and challenging, and such that sustaining the positive accuracy score across multiple shots becomes equally difficult and challenging for the shooter. Preferably, this procedure is repeated until the shooter fires a predetermined of shots at the virtual shooting target or until the shooter succeeds in scoring an accuracy score greater than a predetermined threshold level.

On the other hand, if the accuracy scores corresponding to every shot taken by the shooter follow a negative trajectory, then the microcontroller will selectively increment and decrement predetermined parameter values characterizing the virtual shooting target, such that accurately hitting the virtual shooting target becomes progressively easier. For example, if the microcontroller retains both the wind speed and gravity at a lower value while incrementing the values associated with target visibility, then it is comparatively easy for the shooter to hit the virtual shooting target that has been characterized by lower wind speed, lower gravity, and higher visibility. And in this manner, by selectively incrementing and decrementing predetermined parameter values such that the complexity associated with the characterization of the virtual shooting target is gradually reduced, the microcontroller enables the shooter to achieve higher accuracy scores progressively and to progress from a negative accuracy score-related trajectory to a positive accuracy score-related trajectory.

And in this manner, for every shot taken at the virtual shooting target, and based on the accuracy score associated with every such shot, the microcontroller selectively increments and decrements the values corresponding to each of the parameters characterizing the virtual shooting target, such that the shooter is enabled to practice hitting the (virtual) targets under varying virtual environmental conditions and learn to hit targets with increased accuracy, the varying environmental conditions notwithstanding.

In accordance with the present disclosure, after each shot is taken, the microcontroller selectively increments and decrements the values of the parameters characterizing the virtual shooting target such that for every shot taken up by the shooter, the corresponding virtual shooting target entails varying characteristics, driven by the said characterizing parameters. For instance, if a first shot is taken with low visibility, then the microcontroller adjusts the value of the parameter 'visibility' such that the next shot is taken with moderate visibility. And, if the shooter scores a higher accuracy score against the virtual shooting target embodying moderate visibility and continues to do so for a predetermined number of shots, then the microcontroller may decide that the shooter has attained enough proficiency to operate under low visibility conditions and leave the value of the parameter 'visibility' unchanged from the previous shot, and instead chose to increment or decrement another parameter value selectively, for example, gravity. And after the completion of a predetermined number of shots, if the microcontroller determines, basis the corresponding accuracy score, that the shooter has attained enough proficiency in operating under high gravity conditions, it may leave the value of the parameter 'visibility' unchanged from the previous shot, and instead chose to increment or decrement another parameter value selectively, for example, the elevation corresponding to the virtual shooting target. And in this manner, the microcontroller familiarizes the shooters with a variety of parameters characterizing the virtual shooting target, varying parameter values iteratively assigned to each of the parameters, and the resultant varying environmental conditions and the corresponding complexities that influence the manner in which a (virtual) shooting target is visualized and shot at.

In accordance with the present disclosure, as discussed above, as soon as the shooter completes his first shot at the virtual shooting target, the microcontroller, using the procedure discussed hitherto, calculates the accuracy associated with the first shot of the shooter. However, to determine the consistency with which the shooter hits the virtual shooting target, the microcontroller waits until the shooter completes a predetermined number of shots, and preferably, in this case, twelve shots. Soon after the shooter completes twelve shots, the microcontroller determines the consistency corresponding to the shots fired by the shooter, based on the distance between a predetermined center point of the virtual shooting target and each of the (virtual) points of impact created by the shots (virtually) fired by the shooter.

And, in accordance with the present disclosure, the microcontroller employs a reinforcement learning approach, wherein the microcontroller is pre-programmed with legacy information indicative of the relationship between the values assigned to the parameters that characterized the virtual shooting target and the corresponding consistency scores. For instance, the microcontroller may be pre-programmed, preferably during a training stage, with the information that when the parameters 'altitude' and 'shooting distance' are assigned values ranging between 'very low' and 'moderately low,' the corresponding consistency score always ends up being high, for example, close to ninety percent. Likewise, the microcontroller may be pre-programmed, preferably during the training stage, with the information that whenever the parameters 'gravity' and 'wind speed' are assigned values ranging between 'high' and 'very high,' the corresponding consistency score always ended up being low.

In accordance with the present disclosure, the microcontroller, equipped with the information indicative of the correlation between the consistency score and the values assigned to the parameters characterizing the virtual shooting target, may iteratively adjust the values of certain parameters such that the shooter is exposed more to those parameters that are deemed likely to have a negative impact on the consistency score. For instance, since the microcontroller is aware that when the values of parameters 'altitude' and 'shooting distance' range between 'very low' and 'moderately low,' the consistency score corresponding to the twelve shots taken under such 'very low' to 'moderately low' altitude and shooting distance-related conditions always remains high, the microcontroller decides to leave the increment the values of parameters 'altitude' and 'shooting distance' for the next set of 'twelve' shots—such that the complexity of visualizing and hitting the next twelve shots becomes progressively difficult given the progressive increments to the values of the parameters 'altitude' and 'shooting distance'—and also simultaneously concentrate on the values assignable to the parameter 'gravity.'

And, with the value of 'gravity' set to 'high' and the values of parameters 'altitude' and 'shooting distance' ranging between 'very low' to 'moderately low' for the next 'twelve' shots, if the consistency score, after the completion of the (next) twelve shots embodying the aforementioned values (gravity-high; altitude-very low; shooting distance-moderately low), returns a comparatively lower value, then the microcontroller determines that the shooter is not comfortable shooting with higher gravity levels. In response, the microcontroller may set the value of the parameter 'gravity' to 'very low' and set the values of the parameters 'altitude' and 'shooting distance' to 'high.' With the value of the parameter 'gravity' set to 'very low' and the values of the parameters 'altitude' and 'shooting distance' set to 'high,' if the consistency score after the completion of the next twelve shots with the aforementioned values (i.e., gravity-very low; altitude-high; shooting distance-high) returns yet another lower value, then the microcontroller determines that the shooter is not proficient in shooting under high altitude conditions and longer shooting distances, the significant reduction in the rate of gravity notwithstanding. And therefore, under such a scenario, the microcontroller decides to iteratively tweak only the values of the parameters 'gravity,' 'altitude,' and 'shooting distance,' such that the shooter becomes proficient in shooting under conditions involving varying levels of gravity, altitude, and shooting distance.

Further, in accordance with the present disclosure, if the shooter takes twelve shots at a static virtual shooting target and achieves a consistency score above ninety percent, the microcontroller may, after monitoring the shooter's shots and the corresponding consistency score, decide to provide him with a vertically moving virtual shooting target for the next twelve shots. Likewise, when the shooter completes twelve shots with 'gravity,' 'altitude,' and 'shooting distance,' set to 'high,' the microcontroller may, based on the corresponding consistency score, decide to provide him with a virtual shooting target that embodies comparatively lower gravity, lower altitude, and lower shooting distance, for the next twelve shots. And in this manner, based on the consistency scores, the microcontroller provides a shooter with access to different types of virtual shooting targets and enables him to practice hitting the shooting targets under varying conditions with improved consistency.

In accordance with the present disclosure, while the microcontroller calculates the accuracy score for every shot fired by the shooter at the virtual shooting target, the consistency score is calculated, by the microcontroller, only after the shooter completes twelve shots. And it is possible that the parameters characterizing the virtual shooting target are iteratively adjusted for every shot taken by the shooter (other than the first shot) if such parameters are adjusted, by the microcontroller, on the basis of only the accuracy score. Further, the microcontroller is also configured to iteratively adjust the values assigned to the parameters characterizing the virtual shooting target based on the consistency score. In such a case, the parameters are iteratively adjusted based on the consistency score only after the completion of twelve shots by the shooter. Further, it is also possible that a first set of parameters characterizing the virtual shooting target is iteratively adjusted for every shot, based on the corresponding accuracy scores, and a second set of parameters characterizing the virtual shooting target is iteratively adjusted only after the completion of twelve shots and based on the corresponding consistency score.

In accordance with the present disclosure, the monocular scope device 111 mounted on the firearm 101 allows the shooter to practice shooting a variety of virtual shooting targets whose characterization could be dynamically altered by adjusting the values of a plurality of virtual adjustable parameters that govern the illustration (portrayal) of the virtual shooting targets on the micro-display unit 112.

Figure 4:
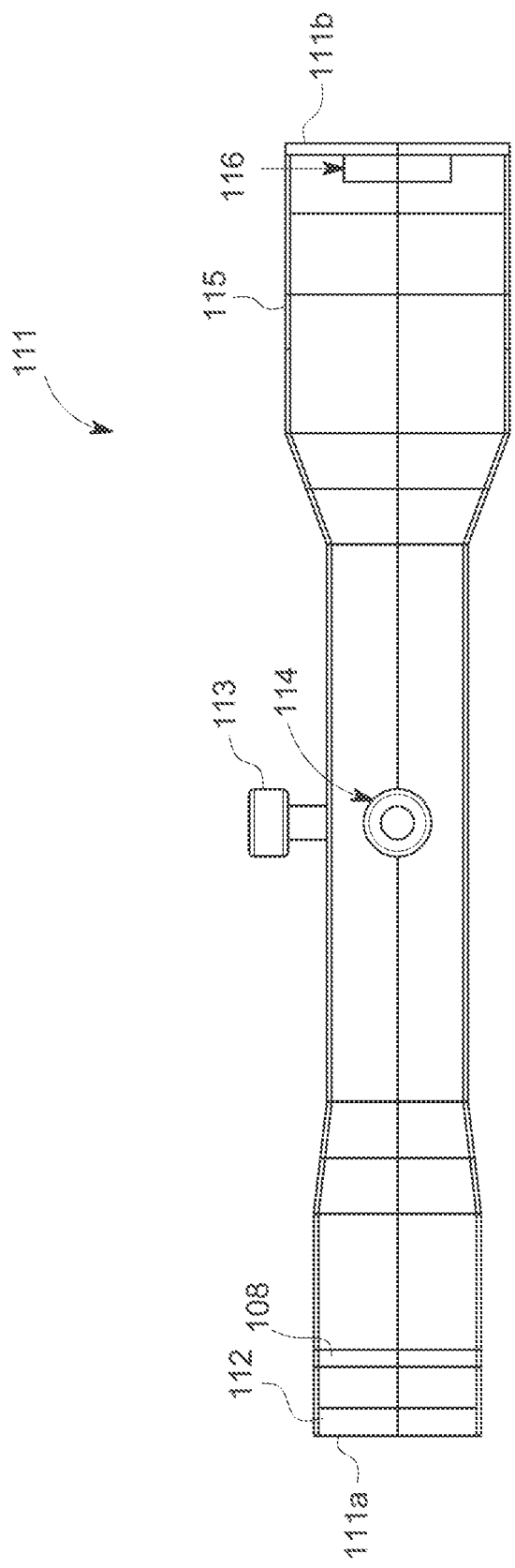
Figure 5:
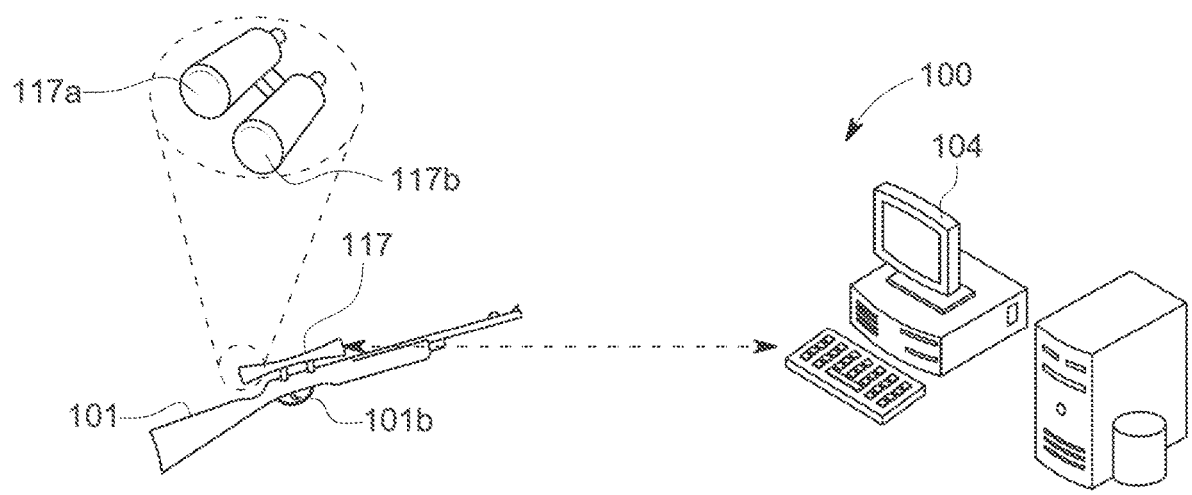
FIG. 5 illustrates a binocular scope device attached to a firearm as a replacement to the default rifle scope thereof, in accordance with the present disclosure.

In accordance with the present disclosure, FIG. 5 illustrates a binocular scope device 117 attached to a firearm 101 without the default rifle scope 101c, illustrated in FIG. 1. In accordance with the present disclosure, the binocular scope device 117 is removably attached to the rail 101a of firearm 101. In accordance with the present disclosure, the binocular scope device 117 replaces the default rifle scope 101c, otherwise attached to the firearm 101 illustrated in FIG. 1. The binocular scope device 117 is a self-contained display device configured as a scope. The binocular scope device 117 is configured to fit on a chassis rail 101a of the firearm 101 and in place of the default rifle scope 101c. The binocular scope device 117 provides binocular vision and has a form factor similar to the regular scope with control elements for adjusting parameters such as elevation, windage, and zoom. The binocular scope device 117 can be used by shooters who prefer to use both the eyes for visualizing and aiming at the shooting targets. With the binocular scope device 117 mounted on the firearm 101, a shooter may aim with both eyes. The binocular scope device 117 allows the shooter to view the same visuals with both eyes. The binocular scope device 117 extends the monocular scope device 111 illustrated in FIGS. 3-4B, by providing an additional micro-display unit (117*b*) for the other eye such that both the eyes of the shooter have the view of the same virtual shooting target.

The binocular scope device 117 renders the virtual shooting targets in a stereoscopic, three-dimensional (3D) model. Other than the binocular sight rendered by the combination of two micro-display units 117*a* and 117*b*, all the other components, including the microcontroller of the binocular scope device 117, are the same as that of the monocular scope device 111 illustrated in the detailed descriptions of FIGS. 3-4B. Also, the functionality of the microcontroller embedded within the binocular scope device 117 is substantially similar to the functionality of the microcontroller embedded within the monocular scope device 111. Also, the construction and functionality of the two micro-display units 117*a* and 117*b* are substantially similar to the construction and functionality of the micro-display unit 112 embedded within the monocular scope device 111, with the exception that the micro-display units 117*a* and 117*b* simultaneously and individually display the same virtual shooting targets thereon, and that both the micro-display units (117*a* and 117*b*) individually and simultaneously coordinate with the microcontroller embedded within the binocular scope device 117.

Given the substantial similarity in the functionalities and configuration between the microcontroller embedded within the monocular scope device 111 and the microcontroller embedded within the binocular scope device 117, it is implicit that the microcontroller embedded within the binocular scope device 117 all the actions and incorporates all the features and functionalities that have been described hitherto with reference to the microcontroller embedded within the monocular scope device 111. The explanation provided with reference to the microcontroller embedded within the monocular scope device 111 is equally applicable to the microcontroller embedded within the binocular scope device 117. And such an explanation has not been repeated with specific references to the microcontroller embedded within the binocular scope device 117 only for the sake of brevity.

As illustrated in FIG. 5, the binocular scope device 117 is configured as a tubular structure comprising binocular viewports with two micro-displays 117*a* and 117*b*. The binocular viewports allow viewing of the virtual shooting targets through the dominant eye as well as the non-dominant eye. Typically, control elements—similar to the ones embedded within the monocular scope device 111—are provided only for the viewport associated with the dominant eye. Alternatively, control elements are provided for the viewport associated with both the dominant eye and the non-dominant eye.

Figure 6:
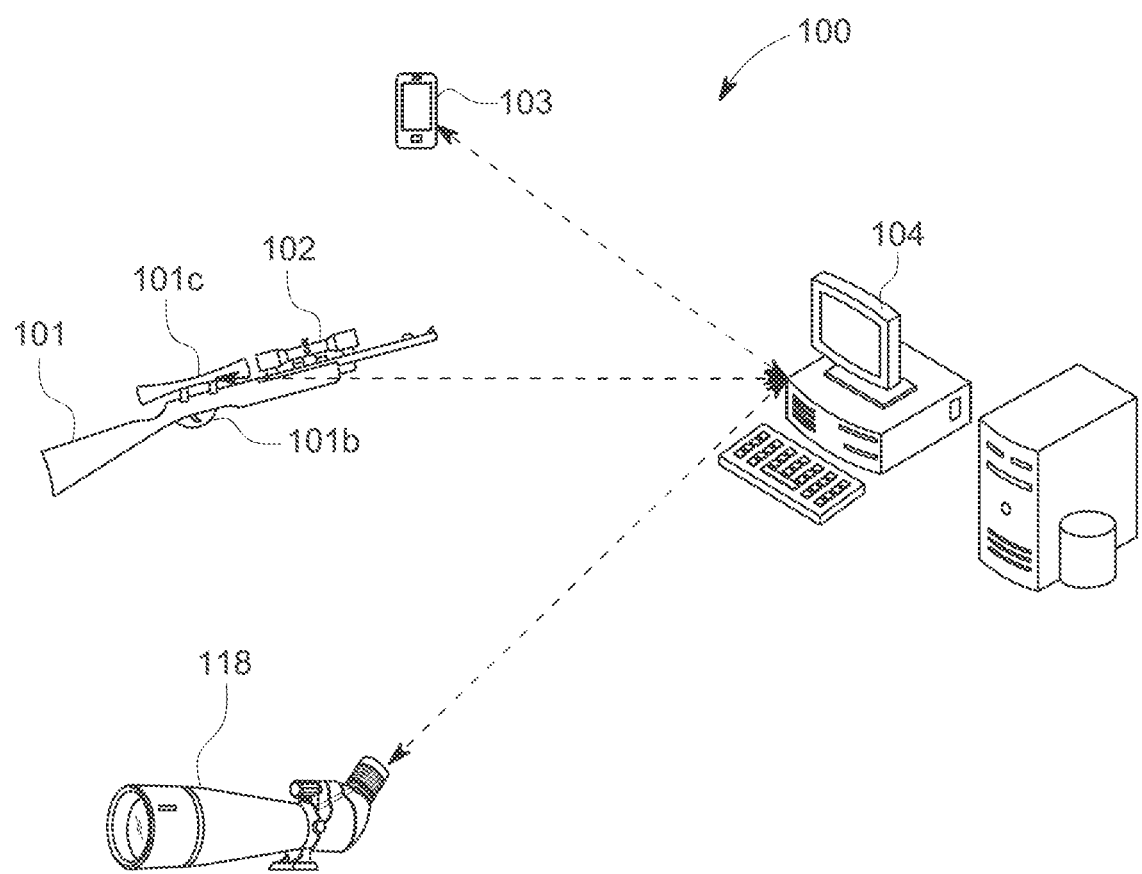
FIG. 6 illustrates a combination of scope devices, in accordance with the present disclosure.

In accordance with the present disclosure, FIG. 6 illustrates a combination of scope devices, for example, a combination of the monocular scope attachment device 102 and a spotter scope device 118. In one or more target shooting scenarios, a rifle shooter is accompanied by a spotter who makes observations and assists the rifle shooter. In a typical shooting environment, virtual or otherwise, a spotter accompanies a shooter. The spotter guides the shooter on where to aim and when to shoot. Both the shooter and spotter have their own scope devices. The role of the spotter is mainly to observe the shooting environment, be aware of the surroundings, identify targets, watch the movement of the identified targets, call a shot, and assess the impact of the shot.

In accordance with the present disclosure, the spotter scope device 118 is a self-contained scope device that operates independently of the firearm 101 onto which a shooter scope device, for example, the monocular scope attachment device 102, is attached. The spotter scope device 118 is utilized in conjunction with the shooter scope device 102, or the monocular scope device 111, or the binocular scope device 117. The monocular scope attachment device 102 and the spotter scope device 118 operate independently. The same is true with the monocular scope device 111 and the binocular scope device 117. The shooter scope device (i.e., one of the monocular scope attachment device 102, monocular scope device 111, and binocular scope device 117) and the spotter scope device 118 are paired such that they share the same virtual target-shooting environment and, in turn, the same virtual shooting targets.

Since the shooter scope device and the spotter scope device 118 operate independently, depending on the direction the shooter and the spotter are looking in a 360-degree space, the shooter and the spotter may view different visuals through their respective scope devices. The spotter scope device 118 has a form factor similar to that of a spotting scope. The images of the virtual shooting targets generated by either the processor (embedded within the computer-based device 103) or the microcontroller (embedded within the monocular scope device 111 and the binocular scope device 117) are rendered viewable on the spotter scope device 118. Any of the interchangeable scope devices used by the shooter and the spotter scope device 118 used by the spotter allow the shooter and the spotter respectively to view the same virtual target-shooting environment and, in turn, the same virtual shooting targets. The spotter scope device 118 is configured as a tubular structure comprising a battery-powered microcomputer embedded therein and configured to drive a micro-display unit of the spotter scope device 118. The spotter scope device 118 comprises control elements configured to adjust at least the magnification for the image displayed on the micro-display unit. The microcomputer of the spotter scope device 118 comprises a storage device configured to store a plurality of virtual shooting targets. Preferably, through a wireless communication protocol, for example, Bluetooth® communication protocol, the scope device (one of the monocular scope attachment device 102, monocular scope device 111, and binocular scope device 117) mounted on the firearm 101 by the shooter is configured to transmit different virtual shooting targets to the microcomputer embedded within the spotter scope device 118. The gyroscope and accelerometer position of the spotter scope device 118 determines the direction of the viewport of the micro-display unit embedded within the spotter scope device 118. The spotter scope device 118 allows a shooter to practice with a spotter, as substantially similar views are rendered on the scope device used by the shooter and the spotter scope device 118 used by the spotter.

Figure 7:
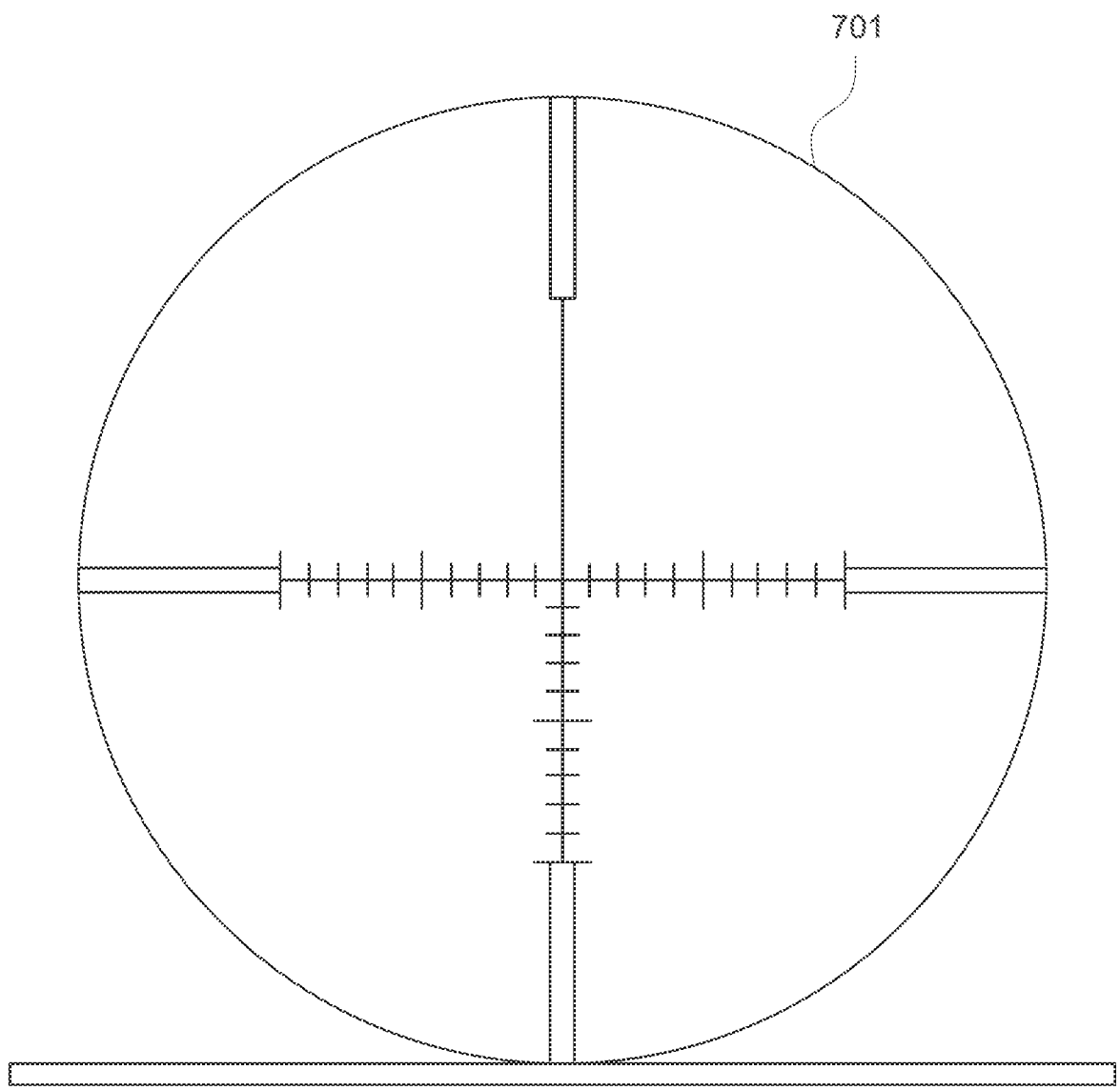
FIG. 7 illustrates a reticle view rendered on a display unit of an interchangeable scope device, in accordance with the present disclosure.

In accordance with the present disclosure, FIG. 7 illustrates a reticle view 701 rendered on a display unit (one of the user interface 103*a*, micro-display unit 112, or the pair of micro-display units 117*a* and 117*b*) of any one of the three scope devices envisaged by the present disclosure, including the monocular scope attachment device 102, monocular scope device 111, and binocular scope device 117. Typically, through the reticle view, the shooter views the virtual shooting targets. Since the reticle view spans 360 degrees, the shooter may position the scope device (one of the monocular scope attachment device 102, monocular scope device 111, and binocular scope device 117) in any direction and view the corresponding virtual shooting target.

Figure 8:
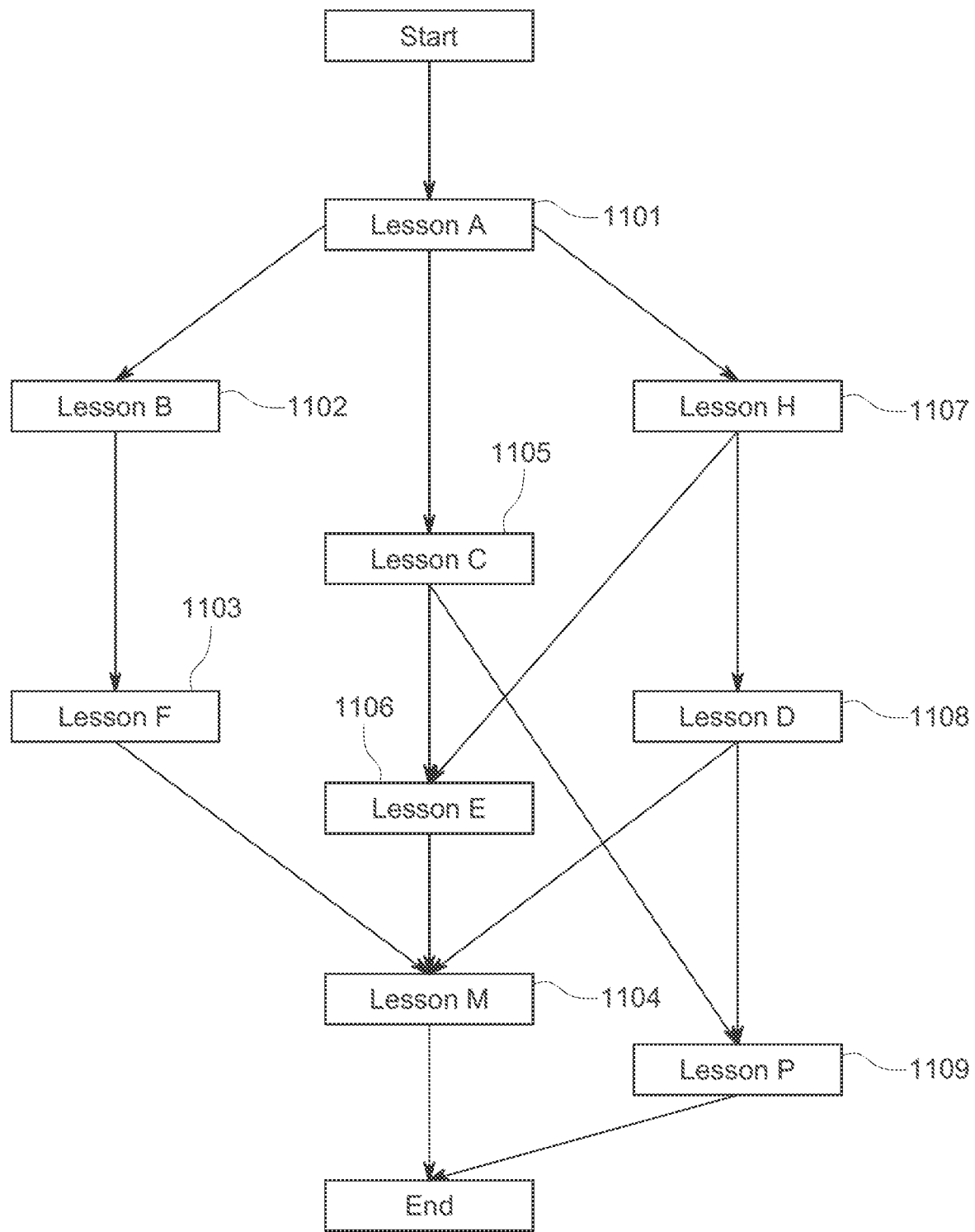
FIG. 8 illustrates a flow diagram of exemplary learning paths generated by the training system and method in accordance with the present disclosure.

In accordance with the present disclosure, FIG. 8 illustrates a flow diagram indicative of exemplary learning paths generated in accordance with the present disclosure. Preferably, each learning path defines a sequence of target shooting exercises a shooter undertakes to learn the nuances of target shooting. As opposed to a conventional method of training where an instructor defines a single path that all shooters with different learning styles must follow, the training system and method envisaged by the present disclosure generates a customized and dynamic learning path for each shooter as they progress through the target shooting exercises. As exemplarily illustrated in FIG. 8, each learning path comprises multiple possible branches associated with target shooting exercises that the shooters may undertake to learn the nuances of target shooting.

For example, lesson A1101 corresponds to scope basics; lesson B1102 corresponds to aim; lesson C1105 corresponds to ballistics; lesson D1108 relates to shooting virtual targets located within a predefined distance, for example, five-hundred meters; lesson E1106 trains the shooters to shoot targets over located beyond a predefined distance, for example, five-hundred meters; lesson F1103 trains the shooters to shoot moving targets; lesson H 1107 trains the shooters to shoot with spindrift; lesson M 1104 trains the shooters to shoot targets in a windy environment; and lesson P1109 trains the shooters to shoot targets in a dusty environment. The branch or lesson to be undertaken by a shooter is identified based on the learning style of the shooter. Some shooters learn some target shooting exercises at a quicker rate, whereas other shooters may necessitate more practice. The training system and method envisaged by the present disclosure determine and learn the capabilities of each of the shooters—preferably based on the accuracy scores and consistency scores achieved by the shooters by shooting at the virtual shooting targets—and customizes the learning path for each shooter. Few possible learning paths and their associated target shooting exercises that may be undertaken by the shooters are exemplarily illustrated in FIG. 8.

In an exemplary scenario, a shooter intends to undertake target shooting practice with any one of the interchangeable scope devices 102, 111, and 117, i.e., monocular scope attachment device 102, monocular scope device 111, and binocular scope device 117. The shooter mounts one of the interchangeable scope devices 102, 111, and 117 on a firearm 101, for example, a rifle, and powers on the scope device 102, or 111, or 117. Subsequent to being powered on, the selected scope device renders a reticle view as illustrated in FIG. 7. Further, the scope device triggers the display of a 360-degree view of a virtual target-shooting environment comprising a plurality of virtual shooting targets. Since a 360-degree view is displayed on either the user interface 103a, or the micro-display unit 112, or the pair of micro-display units 117a and 117b, as the case may be, the shooter could position his firearm 101 and the selected scope device (102, or 111, or 117) in any direction but still view the virtual shooting targets emplaced within the virtual target-shooting environment.

In accordance with the present disclosure, the user interface 103a, or the micro-display unit 112, or the pair of micro-display units 117a and 117b could be triggered either by a processor (embedded within the monocular scope attachment device 102) or a microcontroller (embedded within both monocular scope device 111 and binocular scope device 117) to display hints that may assist the shooter in appropriately visualizing and aiming at the targets displayed on the user interface 103a, or the micro-display unit 112, or the pair of micro-display units 117a and 117b. The hints typically define adjustments to be made either prior to the beginning of a predetermined shooting exercise and also while participating in the shooting exercise. For example, hints provided to a shooter may describe the number of turns required on the elevation knob and windage knob for adjusting the elevation and windage for a particular scope device. To shoot a virtual shooting target, the shooter could adjust the control elements, for example, the elevation and windage knobs on the selected scope device after considering the distance to the virtual shooting target and the virtual adjustable parameters characterizing the virtual shooting target. After making the necessary adjustments to the selected scope device, the shooter could pull the trigger 101b of the firearm 101 to release a virtual projectile. Further, the shooter could also view the theoretical travel path or the trajectory of the virtual projectile till the virtual projectile reaches its destination, the virtual shooting target.

In accordance with the present disclosure, FIG. 9 illustrates an exemplary performance report 900 generated in accordance with the present disclosure. The performance report 900 includes performance metrics indicative of the target-practicing-related performance of a shooter vis-à-vis each shot fired by the shooter at the corresponding virtual shooting targets and the values of the virtual adjustable parameters governing the characterization of each of the corresponding virtual shooting targets. The performance report 900 illustrated in FIG. 9 incorporates information on the last ten shots fired by a shooter using a firearm 101 mounted with one of the monocular scope attachment device 102, monocular scope device 111, and binocular scope device 117, and the values assigned to the virtual adjustable parameters (in this case, the wind speed and shooting distance) that governed the characterization (or portrayal) of the corresponding virtual shooting target during when the shooter took his ten shots. The performance report 900 also illustrates the points of impact (900a), i.e., the locations on the virtual shooting range where the shooter's shots have likely impacted, and enables the shooter to gauge the accuracy of the shots vis-à-vis the adjustments to the said virtual adjustable parameters (in this case, the wind speed and shooting distance).

Technical Advantages

The technical advantages envisaged by the present disclosure include the realization of a shooting training system and method that provides virtual, three-dimensional shooting targets as a replacement for the objective forms of shooting targets used in brick and mortar shooting ranges. The three-dimensional shooting targets envisaged by the present disclosure are displayed on purpose-made scope devices that are mutually interchangeable. The purpose-made scope devices, each configured to be attached to conventional firearms, transform the conventional firearms, upon attachment thereto, into shooting training devices that display virtual shooting targets. By transforming conventional firearms into shooting training devices capable of displaying virtual, three-dimensional shooting targets, the training system and method envisaged by the present disclosure enables shooters to practice target shooting from places and times of their choosing and without essentially having to visit a shooting range.

Also, since in the case of the training system and method of the present disclosure, the virtual shooting targets are displayed using the display mechanism inherent to the purpose-made scope devices, the environmental conditions-related parameters that influence target shooting, including the elevation associated with the shooting target, wind speed, wind direction, zoom range, temperature, time of day, the shape of the shooting target, type of said shooting target, shooting distance, range of motion associated with said shooting target, humidity, altitude, and the response provided by said shooting target on being shot, can also be virtually adjusted in a seamless manner such that the adjustments to the aforementioned parameters are reflected in real-time on the virtual shooting targets.

Also, since in the case of the training system and method of the present disclosure, multiple environmental conditions-related parameters affecting target shooting can be adjusted in real-time, the shooter is provided with an opportunity to evaluate himself simultaneously on each such parameter. Further, conventional brick and mortar shooting ranges may not possess the infrastructure necessary to assess a shooter's performance objectively. But in the case of the training system and method of the present disclosure, the shooter can assess himself objectively and comprehensively by tracking his shooting accuracy and consistency against every parameter mentioned above, and also iteratively adjust any of the above-mentioned parameters and test his shooting accuracy and consistency against every such iterative adjustment and also evaluate his progress vis-A-vis such iterative adjustments.

Further, the shooting training system and method envisaged by the present disclosure provide shooters with exposure to varying environmental conditions-related parameters that affect the accuracy and consistency of target shooting. And, it is nearly impossible to avail exposure to such environmental conditions-related parameters in brick and mortar shooting ranges since none of the aforementioned environmental conditions-related parameters can be reasonably simulated and controlled unless replicated virtually. Even though brick and mortar shooting ranges manage to factor in some of the environmental conditions-related parameters such as the wind direction, temperature, and humidity, the range of adjustments available for such parameters is likely to be extremely limited. And in the case of outdoor shooting ranges, the shooter's control over environmental conditions-related parameters such as the wind direction, temperature, and humidity is as good as none, for the outdoor shooting ranges are highly exposed in their entirety to such parameters and the changes, rapid and progressive thereto. But in the case of the shooting training system and method envisaged by the present disclosure, not only can the shooter control and iteratively adjust each of the environmental conditions-related parameters but can also program the training regimen to accommodate varying environmental conditions-related parameters automatically and thus present, via the purpose-made scopes, shooting targets embodying varying environmental conditions-related parameters and thus varying complexities.

Moreover, while traditional brick and mortar shooting ranges exhibit a one size fits all approach, the training system and method envisaged by the present disclosure enable each shooter to use his own firearm as long as one of the purpose-made scopes is attached thereto; switch between various shooting targets as per his convenience and requirements; iteratively adjust any of the environmental conditions-related parameters, even between individual shots; track his progress in target shooting vis-á-vis iterative adjustments to the environmental conditions-related parameters. Further, the training system and method envisaged by the present disclosure is self-learning and self-adaptive in the sense that it automatically tracks and analyses a shooter's performance in terms of shooting accuracy and consistency, identifies the shooting targets whose characteristics best suit the shooter's current levels of accuracy and consistency, selectively adjusts the environmental conditions-related parameters such that the corresponding shooting targets are in line with the shooter's current levels of accuracy and consistency. And also, the training system and method envisaged by the present disclosure tracks the shooter's response—again, in terms of the shooting accuracy and consistency—to the adjustments made to the environmental conditions-related parameters, and selects, once again, the shooting targets whose characteristics are in line with the shooter's response measured in terms of the shooting accuracy and consistency. And in this manner, the training system and method envisaged by the present disclosure analyzes and learns from the shooter's interactions with the shooting targets and the underlying environmental conditions-related parameters, and adapts the shooting targets such that they evolve, in terms of at least the complexity, in line with the progress made by the shooter shooting accuracy and consistency.

We claim:

1. A system for enabling a user to visualize and shoot at least one virtual shooting target emplaced within a virtual target-shooting environment through at least three mutually interchangeable and mutually exclusive shooting scopes configured to be removably attached onto a firearm accessible to said user, and wherein said three mutually interchangeable shooting scopes include a monocular scope device, a binocular scope device, and a monocular scope attachment device, and wherein:

said monocular scope device and said binocular scope device are configured to be removably attached to said firearm, both said monocular scope device and said binocular scope device comprising:

an optical processing unit programmatically configured to generate at least one three-dimensional image of said at least one virtual shooting target;

at least one micro-display unit embedded therein, said micro-display unit cooperating with said optical processing unit to display said image of said virtual shooting target; and a microcomputer embedded therein, said microcomputer communicably coupled to said optical processing unit and said micro-display, said microcomputer configured to selectively redefine said image of said virtual shooting target by programmatically introducing a plurality of virtual adjustable parameters into said image of said virtual shooting target and thereby programmatically modifying a manner in which said user visualizes and shoots at said virtual shooting target displayed as a re-defined image on said micro-display unit;

and wherein said monocular scope attachment device is configured to be removably attached onto a default rifle scope pre-attached onto said firearm, said monocular scope attachment device comprising:

a recess defined thereon, said recess configured to removably receive a computer-based device embedded with a processor and a user interface, said computer-based device configured to:

generate said image of said virtual shooting target, and trigger a display of said image of said virtual shooting target on said user interface, and render said user interface and said image displayed thereon viewable through said default rifle scope; and selectively and programmatically redefine said image of said virtual shooting target displayed on said user interface, by programmatically introducing said plurality of virtual adjustable parameters into said image of said virtual shooting target displayed on said user interface, and thereby programmatically modify a manner in which said user visualizes and shoots at said virtual shooting target displayed as a re-defined image on said user interface;

and wherein said microcomputer and said processor are configured to dynamically and iteratively adjust at least some of said virtual adjustable parameters in real-time during when said user is visualizing said virtual shooting target through said monocular scope device, said binocular scope device, and said monocular scope attachment device respectively, based on at least one of an accuracy and a consistency previously exhibited by said user in shooting at least said image of said virtual shooting target and said re-defined image of said virtual shooting target.

2. The system as claimed in claim 1, wherein said binocular scope device comprises two separate micro-display units individually viewable by respective eyes of said user, and wherein said two separate micro-display units are configured by said microcomputer to simultaneously display said image of said virtual shooting target thereon.

3. The system as claimed in claim 1, wherein each of said monocular scope device, said binocular scope device, and said monocular scope attachment device is configured to be removably attached onto a rail of said firearm, and wherein said monocular scope device and said binocular scope device are attached as a replacement to said default rifle scope, and wherein said monocular scope attachment device is configured to be attached in line with and onto a distal end of said default rifle scope pre-attached to said firearm.

4. The system as claimed in claim 1, wherein each of said monocular scope device, said binocular scope device, and said monocular scope attachment device include a plurality of control elements embedded therein, said plurality of control elements operable to selectively and iteratively adjust at least some of said virtual adjustable parameters based on predetermined control inputs provided by said user.

5. The system as claimed in claim 1, wherein each of said monocular scope device, said binocular scope device, and said computer-based device inserted into said recess of said monocular scope attachment device comprise at least one in-built gyroscope and at least one in-built accelerometer, and wherein said gyroscope and said accelerometer are configured, in combination, to determine a position and orientation of said firearm and at least one of said monocular scope attachment device, said monocular scope device, and said binocular scope device selectively mounted thereon, with reference to said image of said virtual shooting target selectively displayed on one of said micro-display unit and said user interface.

6. The system as claimed in claim 1, wherein said virtual adjustable parameters are selected from a group of parameters consisting of elevation associated with said virtual shooting target, wind speed, wind direction, zoom range, temperature, time of day, shape of said virtual shooting target, type of said virtual shooting target, shooting distance, range of motion associated with said virtual shooting target, humidity, altitude, and response provided by said virtual shooting target on being shot.

7. The system as claimed in claim 1, wherein said microcomputer and said processor are communicably coupled to a trigger sensor operatively coupled to a trigger of said firearm, said trigger sensor configured to detect a pull event performed on said trigger when said user shoots a virtual bullet at said virtual shooting target by pulling said trigger, said trigger sensor configured to transmit a predetermined signal to at least one of said microcomputer and said processor in response to said pull event and cause at least one of said microcomputer and said processor to determine an animated trajectory for said virtual bullet, and selectively cause one of said micro-display unit and said user interface to display said animated trajectory.

8. The system as claimed in claim 1, wherein said monocular scope attachment device further includes an eyepiece lens and an objective lens positioned thereon, such that said objective lens reduces said image of said virtual shooting target displayed on said user interface to a pre-designated image point located thereon, and said eyepiece lens magnifies said image about said image point and projects magnified image onto said default rifle scope mounted on said firearm, such that said image is viewable through said default rifle scope.

9. The system as claimed in claim 1, wherein said recess is created on a bottom section of said monocular scope attachment device, such that said computer-based device is accommodated into said recess in a flat position and positioned at said bottom section of said monocular scope attachment device.

10. The system as claimed in claim 1, wherein said binocular scope device comprises two micro-display units, each of said two micro-display units communicably coupled to said microcomputer and said optical processing unit, and configured to display to said image of said virtual shooting target.

11. The system as claimed in claim 1, wherein both said microcomputer and said processor are configured to:
determine said user's response to a dynamic and iterative adjustment of at least some of said virtual adjustable parameters, and quantify said user's response to said dynamic and iterative adjustment in terms of at least said consistency and said accuracy;

analyze said user's response quantified in terms of said consistency and said accuracy, in combination with values representative of said dynamic and iterative adjustments incorporated into said at least some of said virtual adjustable parameters;

selectively and sequentially present a plurality of additional images of virtual shooting targets to said user on at least one of said micro-display unit and said user interface, and selectively and iteratively adjust at least some of said virtual adjustable parameters for each of said plurality of virtual shooting targets presented to said user, based on at least one of said accuracy and said consistency previously exhibited by said user in shooting at least said image of said virtual shooting target, said re-defined image of said virtual shooting target; and determine a learning path for said user, based on said consistency and said accuracy exhibited by said user in shooting said image of said virtual shooting target, said re-defined image of said virtual shooting target, and said plurality of additional images of virtual shooting targets.

12. The system as claimed in claim 1, wherein said system includes a spotter scope device operable independent of said firearm accessible to said user, said spotter scope device configured to selectively cooperate with one of said optical processing unit and said processor, only when one of said monocular scope device, said binocular scope device, and said monocular scope attachment device are mounted on said firearm, to trigger a simultaneous display said virtual shooting target on a display device embedded into said spotter scope device.

* * * * *